(12) United States Patent
Okano

(10) Patent No.: US 9,104,019 B2
(45) Date of Patent: Aug. 11, 2015

(54) EYEPIECE LENS AND DISPLAY UNIT

(71) Applicant: SONY CORPORATION, Tokyo (JP)

(72) Inventor: Hideaki Okano, Aichi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/273,837

(22) Filed: May 9, 2014

(65) Prior Publication Data

US 2014/0347739 A1 Nov. 27, 2014

(30) Foreign Application Priority Data

May 23, 2013 (JP) .................................. 2013-108669

(51) Int. Cl.
*G02B 25/00* (2006.01)
(52) U.S. Cl.
CPC .................................... *G02B 25/001* (2013.01)
(58) Field of Classification Search
CPC ....... G02B 25/001; G02B 13/003; G02B 9/06
See application file for complete search history.

(56) References Cited

U.S. PATENT DOCUMENTS

2009/0310220 A1* 12/2009 Suzuki ......................... 359/558

FOREIGN PATENT DOCUMENTS

| JP | 2005-134867 A | 5/2005 |
| JP | 2009-145909 A | 7/2009 |
| JP | 2010-266776 A | 11/2010 |

* cited by examiner

*Primary Examiner* — Joseph P Martinez
(74) *Attorney, Agent, or Firm* — Sony Corporation

(57) ABSTRACT

An eyepiece lens includes: a first lens having positive refractive power, the first lens having a convex surface that faces toward an eye point side; and a second lens having positive refractive power, the second lens having a convex surface that faces toward the eye point side. The first and second lenses are arranged in order from the eye point side. Following conditional expressions are satisfied, $$3.0 > (h \times \omega)^{1/2}/E > 1.2 \quad (1)$$

$$2.3 > (L-E)/h > 1.5 \quad (2)$$

where h is a height of the image at a horizontal end, ω is a half angle of view in a horizontal direction, E is a distance from an eye point to the first lens, the distance being an eye relief, and L is a distance from the eye point to the image.

10 Claims, 21 Drawing Sheets

EXAMPLE 1

EXAMPLE 12

EXAMPLE 13

EXAMPLE 14

EYEPIECE LENS AND DISPLAY UNIT

CROSS REFERENCE TO RELATED APPLICATIONS

This application claims the benefit of Japanese Priority Patent Application JP 2013-108669 filed May 23, 2013, the entire contents of each which are incorporated herein by reference.

BACKGROUND

The present disclosure relates to an eyepiece lens that magnifies an image (such as an image displayed on an image display device), and to a display unit suitable as a unit such as a head-mounted display that uses such an eyepiece lens.

As an display unit that uses an image display device, an electronic view finder, an electronic binocular, a head-mounted display, etc. are known.

SUMMARY

In a head-mounted display, in particular, it is desired that an eyepiece optical system and a main body of a display unit are compact and light in weight since the main body of the display unit is worn in front of one's eyes and are used for a long time. However, it is necessary to allow an angle of view to be wide in order to create a sense of immersion so that a user is drawn into an image or a picture. Therefore, glass has been used for the eyepiece optical system in some cases. Also, a plurality of pieces of glass that have different refractive indices and dispersion characteristics have been used in some cases in order to correct aberration, in particular, chromatic aberration. In such cases, it is possible to achieve favorable optical performance and to create a high sense of immersion while securing a wide angle of view. However, a user wears the heavy eyepiece optical system and the heavy main body of the display unit in front of his or her eyes due to the use of glass. A long-time use of such eyepiece optical system and display unit causes the user to be extremely tired.

Eyepiece optical systems disclosed in Japanese Unexamined Patent Application Publication Nos. 2005-134867 and 2009-145909 each use a plurality of pieces of glass to achieve a wide angle of view. A plurality of pieces of glasses having different refractive indices and different dispersion characteristics are used to favorably correct various aberrations such as chromatic aberration. By thus presenting a clear image, a high sense of immersion is successfully created. However, these eyepiece optical systems are extremely heavy due to the use of many pieces of glasses. Therefore, a long-time use of such eyepiece optical systems may cause symptoms that damage one's health such as fatigue in neck or shoulder. Further, the use of many pieces of expensive glass leads to high cost. Accordingly, it is difficult to provide such eyepiece optical systems to customers at a price which is easy to afford.

An eyepiece optical system disclosed in Japanese Unexamined Patent Application Publication No. 2010-266776 uses many resin lenses, and therefore it may be considered to be light in weight. Therefore, it may be considered that such an eyepiece optical system does not damage one's health even if being worn for a long time, and has superior wearing characteristics. It may be considered that the eyepiece optical system favorably corrects aberrations, has high performance as an optical system, and achieves favorable view of an image. However, this eyepiece optical system is not favorable to secure a wide angle of view. Therefore, it is difficult to create a high sense of immersion.

Accordingly, it is desired to develop an eyepiece optical system that is manufactured at low cost, magnifies an image on the image display device as large as possible, creates a high sense of immersion by achieving a wide angle of view which is important for a head-mounted display, has light weight, has favorable wearing characteristics, and does not cause a user to be tired even if being used for a long time. It is also desired to develop a display unit that uses such an eyepiece optical system.

It is desirable to provide an eyepiece lens and a display unit that are capable of magnifying an image with a wide angle of view, and of achieving performance suitably used for a unit such as a head-mounted display.

According to an embodiment of the present disclosure, there is provided an eyepiece lens including: a first lens having positive refractive power, the first lens having a convex surface that faces toward an eye point side; and a second lens having positive refractive power, the second lens having a convex surface that faces toward the eye point side. The first and second lenses are arranged in order from the eye point side. Following conditional expressions are satisfied, $$3.0 > (h \times \omega)^{1/2}/E > 1.2 \tag{1}$$

$$2.3 > (L-E)/h > 1.5 \tag{2}$$

where h is a height of the image at a horizontal end, $\omega$ is a half angle of view in a horizontal direction, E is a distance from an eye point to the first lens, the distance being an eye relief, and L is a distance from the eye point to the image.

According to an embodiment of the present disclosure, there is provided a display unit including: an image display device; and an eyepiece lens configured to allow an image displayed on the image display device to be magnified. The eyepiece lens includes: a first lens having positive refractive power, the first lens having a convex surface that faces toward an eye point side; and a second lens having positive refractive power, the second lens having a convex surface that faces toward the eye point side. The first and second lenses are arranged in order from the eye point side. Following conditional expressions are satisfied, $$3.0 > (h \times \omega)^{1/2}/E > 1.2 \tag{1}$$

$$2.3 > (L-E)/h > 1.5 \tag{2}$$

where h is a height of the image at a horizontal end, $\omega$ is a half angle of view in a horizontal direction, E is a distance from an eye point to the first lens, the distance being an eye relief, and L is a distance from the eye point to the image.

In the eyepiece lens and the display unit according to the above-described embodiments of the present disclosure, the first and second lenses are arranged in order from the eye point side, and the configurations of the respective lenses are optimized. This allows an image to be magnified with a wide angle of view. Accordingly, it is possible to achieve performance that is suitably used for a unit such as a head-mounted display.

According to the eyepiece lens and the display unit according to the above-described embodiments of the present disclosure, the first and second lenses are arranged in order from the eye point side, and the configurations of the respective lenses are optimized. Therefore, an image is allowed to be magnified with a wide angle of view. Accordingly, it is possible to achieve performance that is suitably used for a unit such as a head-mounted display.

It is to be noted that the effects disclosed in the present specification are mere examples, and the effect of the embodiment of the present disclosure is not limited thereto. Also, the embodiment of the present disclosure may have additional effects.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
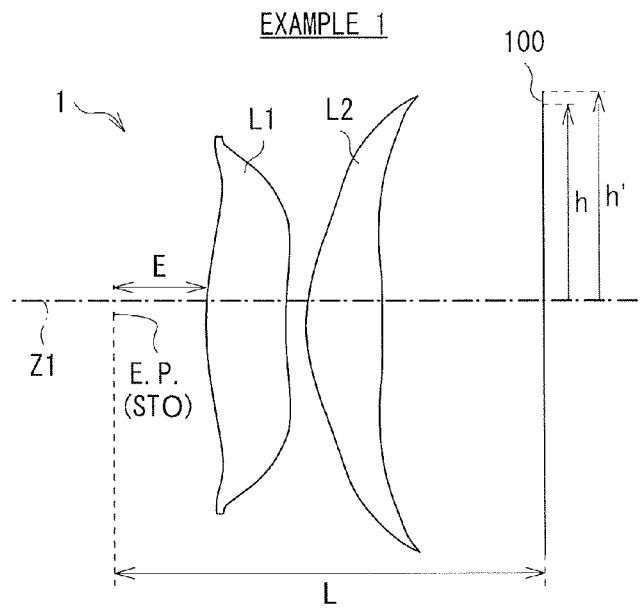
FIG. 1 illustrates a first configuration example of an eyepiece lens according to an embodiment of the present disclosure, and is a cross-sectional view of a lens corresponding to Numerical example 1.

An embodiment of the present disclosure will be described below in detail referring to the drawings. The description will be provided in the following order.
1. Basic Configuration of Lens
2. Functions and Effects
3. Example of Application to Display Unit
4. Numerical Examples of Lenses
5. Other Embodiments 1. Basic Configuration of Lens FIG. 1 illustrates a first configuration example of an eyepiece lens according to an embodiment of the present disclosure. This configuration example corresponds to a configuration of a lens in Numerical example 1 which will be described later. A configuration of the eyepiece lens according to the present embodiment will be appropriately described below in correspondence with the configuration example shown in FIG. 1. However, the technology of the present disclosure is not limited to the configuration examples illustrated in the drawings.

The eyepiece lens according to the present embodiment is substantially configured of two lenses that are a first lens L1 and a second lens L2 arranged in order from an eye point E.P. side along an optical axis Z1.

This eyepiece lens may be applicable, for example, as an eyepiece optical system in a display unit such as a head-mounted display 200 (FIGS. 41 and 42) which will be described later. In a case where this eyepiece lens is applied to the display unit such as the head-mounted display 200, this eyepiece lens is used for magnifying an image displayed on an image display device 100 such as an LCD (Liquid Crystal Display) and an organic EL display as shown in FIG. 1. A component such as a sealant glass for protecting the image display device 100 may be arranged on a front surface of the image display device 100.

The eye point E.P. corresponds to a position of a pupil of a viewer, and serves also as an aperture stop STO. The first lens L1 has positive refractive power, and has a convex surface facing toward the eye point E.P. side. The second lens L2 has positive refractive power, and has a convex surface facing toward the eye point E.P. side.

An image-sided surface of the first lens L1 and an image-sided surface of the second lens L2 each may desirably have an aspherical shape. The eye-point-E.P.-sided surface of the first lens L1 may desirably have an aspherical shape that has an inflection point. The first lens L1 and the second lens L2 each may desirably be configured of a material that has a linear expansion coefficient of $20 \times 10^{-6}/°$ C. or larger.

In addition to the above, the eyepiece lens according to the present embodiment may desirably satisfy predetermined conditional expressions etc. which will be described later.

2. Functions and Effects

Next, description will be given of functions and effects of the eyepiece lens according to the present embodiment.

According to the eyepiece lens of the present embodiment, the first lens L1 closer to the eye point E.P. is a convex lens that has a convex surface facing toward the eye point E.P. side, as a basic configuration. Therefore, it is possible to secure a wide angle of view for creating a high sense of immersion. Also, the second lens L2 closer to the image display device 100 is a convex lens that has a convex surface facing toward the eye point E.P. side, as the basic configuration. Therefore, the second lens L2 in combination with the first lens L1 allows an image to be further magnified. Therefore, a wide angle of view is secured.

Moreover, by allowing the image-sided surface of the first lens L1 and the image-sided surface of the second lens L2 to have aspherical shapes as a preferable configuration, aberration, in particular, comma aberration is favorably corrected with a small number of lenses. Also, even when a position of one's eye moves with respect to the optical axis Z1 during viewing, for example, even when a viewing position shifts in a lateral or vertical direction, the image on the image display device 100 is not disturbed much. Thus, such a configuration contributes to securing favorable visibility. In particular, the aspherical shape of the image-sided surface of the second lens L2 allows a light ray from the image display device 100 to enter the optical system at an angle which is not so large. As a result, color shift which may be caused by a color filter in the image display device 100 is prevented. Thus, such a configuration contributes to favorably magnifying an image or a picture with less color shift.

By allowing the eye-point-E.P.-sided surface of the first lens L1 to have an aspherical shape that has an inflection point as a preferable configuration, it is possible to favorably correct occurrence of aberration in a case where the position of one's eye moves with respect to the optical axis Z1 during viewing. Therefore, such a configuration contributes to securing favorable visibility without causing the image on the image display device 100 to be disturbed much even when the position of one's eye moves during the viewing.

Moreover, by favorably configuring each of the first lens L1 and the second lens L2 of the material having a linear expansion coefficient of $20 \times 10^{-6}/°$ C., it is possible to provide an extremely-light eyepiece lens that is less likely to cause a user to be tired even with wearing the eyepiece lens in front of one's eyes for a long time, and that largely magnifies the image from the image display device 100 and secures a wide angle of view.

[Description of Conditional Expressions]

The eyepiece lens according to the present embodiment achieves more favorable performance by optimizing the configurations of the respective lenses so as to satisfy at least one, preferably, two or more in combination, of the following conditional expressions.

$$3.0>(h\times\omega)^{1/2}/E>1.2 \tag{1}$$

In the above-described Conditional expression (1), h is a height of the image at a horizontal end (see FIG. 1), ω is a half angle of view in a horizontal direction, and E is a distance (an eye relief) from the eye point E.P. to the first lens L1 (see FIG. 1).

It is to be noted that, when the eyepiece lens according to the present embodiment is applied to a display unit such as the head-mounted display 200 (FIGS. 41 and 42) which will be described later, h is a height at a horizontal end of an image displayed on the image display device 100. For example, when the image display device 100 has a quadrangular shape, a maximum height of the image is a height h' at a diagonal end. The height h at the horizontal end has a value smaller than that of the height h' at the diagonal end as shown in FIG. 1. The height h at the horizontal end is used in the conditional expressions taking into consideration visibility in a case where the eyepiece lens is applied to a display unit such as the head-mounted display 200.

Conditional expression (1) shows a relationship of the horizontal half angle of view ω and the eye relief E with respect to the height h at the horizontal end of the image, based on the above-described basic configuration. Basically, as the image to be magnified is larger, it is easier to secure a wide angle of view. Also, as the distance between the eye point E.P. and the first lens L1 is shorter, it is easier to secure a wide angle of view as well. Specifically, when a value of $(h\times\omega)^{1/2}/E$ is smaller than the range shown in Conditional expression (1), it is difficult to achieve a wide angle of view while keeping favorable quality of image. This may lead, for example, to loss of attractiveness as the display unit in the case where the eyepiece lens is applied to the head-mounted display. When the value of $(h\times\omega)^{1/2}/E$ is larger than the range shown in Conditional expression (1), the distance between the eye point E.P. and the first lens L1 becomes excessively short. This may lead, for example, to degradation in wearing characteristics in the case where the eyepiece lens is applied to the head-mounted display. For example, this may set a condition in wearing the head-mounted display. Examples of such a condition may include that the head-mounted display is unwearable when the viewer wears eyeglasses.

It is to be noted that the numerical range of Conditional expression (1) may be preferably set as in following Conditional expression (1)' in order to achieve a wide angle of view while keeping more favorable quality of image.

$$2.6>(h\times\omega)^{1/2}/E>1.4 \tag{1}'$$

$$2.3>(L-E)/h>1.5 \tag{2}$$

In the above-described Conditional expression (2), L is a distance from the eye point E.P. to the image (see FIG. 1).

Conditional expression (2) shows a relationship of a value obtained by subtracting a length of the eye relief E from a total length L of the optical system with respect to the height h at the horizontal end of the image, based on the above-described basic configuration. When a value of (L−E)/h is larger than the range shown in Conditional expression (2), the length from the eye-point-E.P.-sided surface of the first lens L1 to the image display device 100 becomes long. Therefore, although aberration is favorably corrected, for example, in the case where the eyepiece lens is applied to the head-mounted display, the head-mounted display becomes too long to wear in front of one's eyes. Thus, such a configuration degrades wearing characteristics. Also, in such a configuration, the image display device 100 which is a weight object is located in a position away from one's eyes. Therefore, a moment originating on the position of one's eye is caused, which further degrades the wearing characteristics. When the value of (L−E)/h is smaller than the range shown in Conditional expression (2), the above-described point is improved and the wearing characteristics are improved. However, in reverse, it becomes difficult to correct aberration by the optical system, and therefore, optical performance is degraded. As a result, for example, in the case where the eyepiece lens is applied to the head-mounted display, it is difficult to create a sense of immersion with a clear image.

It is to be noted that the numerical range of Conditional expression (2) may be preferably set as in following Conditional expression (2)' in order to achieve more favorable wearing characteristics and high optical performance.

$$2.1>(L-E)/h>1.7 \tag{2}'$$

$$3.7>(f1\times f2)^{1/2}/f>1.4 \tag{3}$$

In the above-described Conditional expression (3), f is a total focal length, f1 is a focal length of the first lens L1, and f2 is a focal length of the second lens L2.

Conditional expression (3) shows a relationship of the focal length f1 of the first lens L1 and the focal length f2 of the second lens L2 with respect to the total focal length f of this eyepiece lens. When a value of $(f1\times f2)^{1/2}/f$ is larger than the range shown in Conditional expression (3), power of one of the first lens L1 and the second lens L2 becomes excessively weak. Therefore, it is difficult to maintain the wide angle of view. For example, when the eyepiece lens is applied to the head-mounted display, it may be desirable to allow distortion to occur in some degrees, and to create an aggregation-like state around the center of the screen to create a high-resolution-like state. When the value of $(f1\times f2)^{1/2}/f$ is smaller than the range shown in Conditional expression (3), the power of the first lens L1 becomes excessively close to the power of the second lens L2. Therefore, it is difficult to create the aggregation-like state around the center of the screen and to create a high-resolution-like state.

It is to be noted that the numerical range of Conditional expression (3) may be preferably set as in following Conditional expression (3)' in order to achieve higher optical performance.

$$3.3>(f1\times f2)^{1/2}/f>1.7 \tag{3}'$$

$$40>|(R3+R5)/(R3-R5)| \tag{4}$$

In the above-described Conditional expression (4), R3 is a paraxial curvature radius of the image-sided surface of the first lens L1, and R5 is a paraxial curvature radius of the image-sided surface of the second lens L2.

Conditional expression (4) shows a relationship between the paraxial curvature radius R3 of the image-sided surface of the first lens L1 and the paraxial curvature radius R5 of the image-sided surface of the second lens L2. By allowing Conditional expression (4) to be satisfied, various aberrations, in particular, Petzval sum is adjusted, and astigmatism is corrected.

It is to be noted that the numerical range of Conditional expression (4) may be preferably set as in following Conditional expression (4)' in order to achieve higher optical performance.

$$35 > |(R3+R5)/(R3-R5)| \qquad (4)'$$

$$1.9 > R4/f2 > 0.4 \qquad (5)$$

In the above-described Conditional expression (5), R4 is a paraxial curvature radius of the eye-point-E.P.-sided surface of the second lens L2.

Conditional expression (5) shows a relationship of the focal length f2 of the second lens L2 with respect to the paraxial curvature radius R2 of the eye-point-E.P.-sided surface of the second lens L2. By allowing Conditional expression (5) to be satisfied, it is possible to correct aberration and secure a wide angle of view while securing favorable visibility without allowing the power of the second lens L2 to be so strong. When a value of R4/f2 is larger than the upper limit in Conditional expression (5), the power of the second lens L2 becomes excessively strong. Therefore, although a wide angle of view is secured, error sensitivity with respect to manufacturing error becomes high due to the strong power, which leads to degradation in manufacturing characteristics. When the value of R4/f2 is smaller than the lower limit in Conditional expression (5), the power of the second lens L2 becomes excessively weak. Therefore, it is difficult to keep the wide angle of view. Also, it is difficult to create the aggregation-like state in the screen by allowing distortion to be occurred.

It is to be noted that the numerical range of Conditional expression (5) may be preferably set as in following Conditional expression (5)' in order to achieve higher optical performance.

$$1.8 > R4/f2 > 0.6 \qquad (5)'$$

$$1.0 > R2/f1 > 0.1 \qquad (6)$$

In the above-described Conditional expression (6), R2 is a paraxial curvature radius of the eye-point-E.P.-sided surface of the first lens L1.

Conditional expression (6) shows a relationship of the focal length f1 of the first lens L1 with respect to the paraxial curvature radius of the eye-point-E.P.-sided surface of the first lens L1. When a value of R2/f1 is larger than the upper limit of Conditional expression (6), the power of the first lens L1 becomes excessively strong. Therefore, error sensitivity with respect to manufacturing error becomes high, which leads to degradation in manufacturing characteristics. When the value of R2/f1 is smaller than the lower limit of Conditional expression (6), the power of the first lens L1 becomes excessively weak. Therefore, it is difficult to correct aberration. In particular, when the position of one's eye moves with respect to the optical axis Z1 during viewing, for example, when the viewing position shifts in the lateral or vertical direction, visibility is degraded as a result.

It is to be noted that the numerical range of Conditional expression (6) may be preferably set as in following Conditional expression (6)' in order to achieve higher optical performance.

$$0.8 > R2/f1 > 0.19 \qquad (6)'$$

$$1.2 > (D2+D4)/(D3+D5) > 0.2 \qquad (7)$$

In the above-described Conditional expression (7), D2 is a central thickness of the first lens L1, D3 is a spacing between the first lens L1 and the second lens L2, D4 is a central thickness of the second lens L2, and D5 is a spacing between the second lens L2 and the image.

Conditional expression (7) shows a relationship of the spacing D3 between the first lens L1 and the second lens L2 and the spacing D5 between the second lens L2 and the image, that are thicknesses (D3 and D5) of air lenses, with respect to the central thickness D2 of the first lens L1 and the central thickness D4 of the second lens L2. When a value of (D2+D4)/(D3+D5) is larger than the upper limit in Conditional expression (7), the central thickness D2 of the first lens L1 and the central thickness D4 of the second lens L2 become excessively thick. As a result, weight of the optical system increases. Due to the heavy weight of the optical system, for example, in a case where the eyepiece lens is applied to the head-mounted display, the wearing characteristics are degraded as a result. When the value of (D2+D4)/(D3+D5) is smaller than the lower limit in Conditional expression (7), the thickness of the first lens L1 or the second lens L2, or both become excessively thin. Therefore, the power is not allowed to be sufficiently strong to keep the wide angle of view. As a result, the wide angle of view and the high sense of immersion are degraded.

It is to be noted that the numerical range of Conditional expression (7) may be preferably set as in following Conditional expression (7)' in order to achieve higher optical performance.

$$1.0 > (D2+D4)/(D3+D5) > 0.4 \qquad (7)'$$

As described above, according to the present embodiment, it is possible to magnify the image on the image display device 100 as large as possible at low cost. Also, for example, it is possible to achieve an eyepiece optical system that is light in weight, has favorable wearing characteristics, and does not allow a user to be tired even with long-time use, while achieving a wide angle of view and creation of a high sense of immersion which are important, for example, in a case where the eyepiece optical system is applied to a unit such as the head-mounted display.

3. Example of Application to Display Unit

Figure 41:
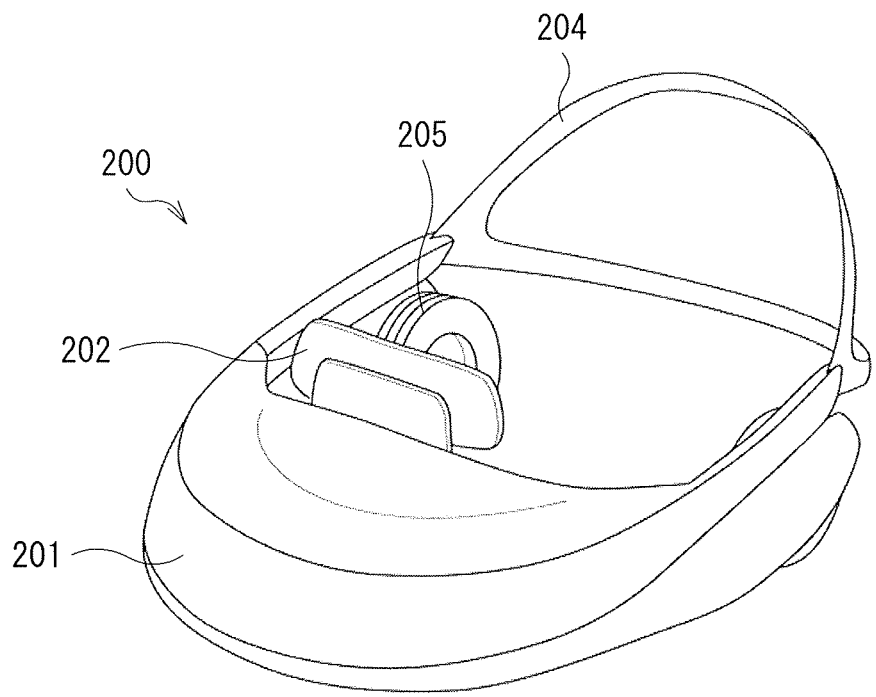
FIG. 41 is a perspective view of an appearance of a head-mounted display as an example of a display unit viewed obliquely from the front.
Figure 42:
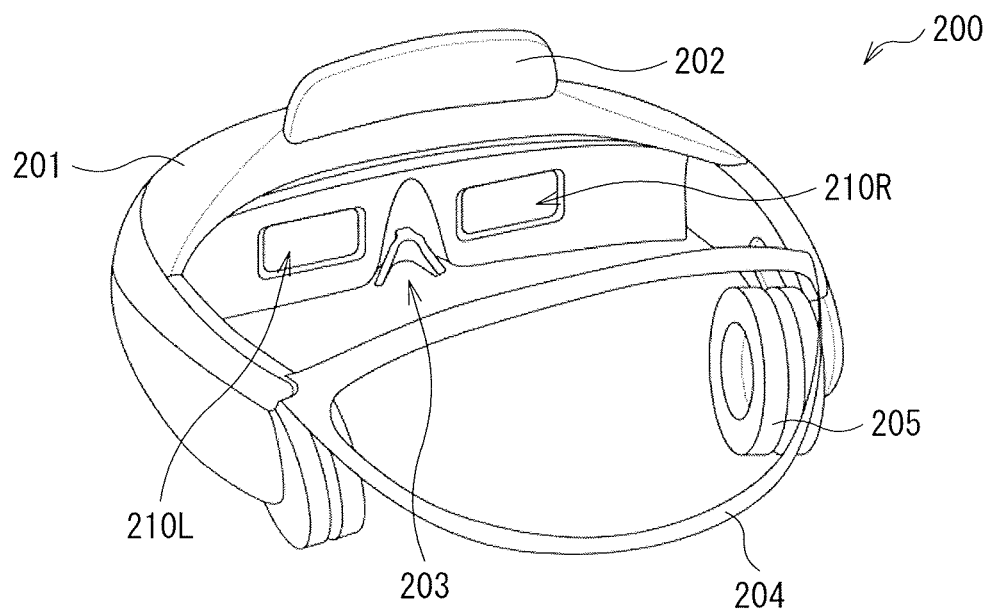
FIG. 42 is a perspective view of the appearance of the head-mounted display as an example of the display unit viewed obliquely from the back.

FIGS. 41 and 42 illustrate a configuration example of the head-mounted display 200 as an example of a display unit to which the eyepiece lens according to the present embodiment is applied. The head-mounted display 200 includes a main body section 201, a forehead support section 202, a nose support section 203, a head band 204, and a headphone 205. The forehead support section 202 is provided at an upper-middle part of the main body section 201. The nose support section 203 is provided at a lower-middle part of the main body section 201.

When the user wears the head-mounted display 200 at one's head, the forehead support section 202 becomes in contact with forehead of the user, and the nose support section 203 becomes in contact with nose of the user. Further, the head band 204 becomes in contact with the back of the head of the user. Thus, the weight of the unit is dispersed to the entire head in this head-mounted display 200. Thus, it is possible to wear this head-mounted display 200 with reducing the load on the user.

The headphone 205 for left and right ears is provided. This allows audio sound to be provided independently to one's left ear and to one's right ear.

The main body section 201 includes a circuit substrate, an optical system, etc. for displaying an image. The main body section 201 includes a left-eye display section 210L and a right-eye display section 210R as shown in FIG. 42. This allows an image to be provided independently to one's left eye and to one's right eye. The left-eye display section 210L includes the image display device 100 for left eye and an eyepiece optical system for left eye that magnifies the image displayed on the image display device 100 for left eye. The right-eye display section 210R includes the image display device 100 for right eye and an eyepiece optical system for right eye that magnifies the image displayed on the image display device 100 for right eye. The eyepiece lens according to the present embodiment is applicable as the above-described respective eyepiece optical systems for left and right eyes.

It is to be noted that image data is supplied from an image reproducing unit which is not illustrated to the image display device 100. It is also possible to perform three-dimensional display by supplying three-dimensional image data from the image reproducing unit and displaying images that have parallaxes on the left-eye display section 210L and the right-eye display section 210R.

It is to be noted that, although an example in which the display unit is applied to the head-mounted display 200 has been described above, the range of application of the display unit according to the present embodiment is not limited to the head-mounted display 200. The display unit according to the present embodiment is applicable to a unit such as an electronic binocular and an electronic view finder in a camera.

Also, the eyepiece lens according to the present embodiment is not limitedly used in order to magnify the image displayed on the image display device 100, and is applicable also to an observation unit such as those magnifying an optical image formed by an objective lens.

EXAMPLES

4. Numerical Examples of Lenses

Next, description will be given of specific numerical examples of the eyepiece lens according to the present embodiment.

Symbols etc. in tables and the description below represent the following. "Si" represents the number of an i-th surface where 1 is attached to the eye point E.P. and the number becomes larger in order as the relevant surface is closer to the image side. "Ri" represents a curvature radius (mm) of the i-th surface. "Di" represents a spacing (mm) on the optical axis between the i-th surface and the (i+1)th surface. "Ndi" represents a value of a refractive index of the d-line (having a wavelength of 587.6 nm) of a material (a medium) of an optical component that has the i-th surface. "vdi" represents a value of an Abbe number, with respect to the d-line, of the material of the optical component that has the i-th surface. A surface having a curvature radius of "∞" is a planar surface or an aperture surface (an aperture stop STO).

A shape of an aspherical surface is represented by the following expression. In the later-described respective tables that show aspherical surface coefficients, for example, "E-i" represents an exponential expression having 10 as a base, i.e., "$10^{-i}$". To give an example, "0.12345E-05" represents "$0.12345 \times 10^{-5}$".

[Expression of Aspherical Surface]

$$Z = (Y^2/R)/[1+\{1-(1+K)(Y^2/R^2)\}^{1/2}] + \Sigma A_i \cdot Y^i$$

In the above-described expression, Z is a depth of the aspherical surface, Y is a height from the optical axis, R is a paraxial curvature radius, K is a conic constant, and Ai is an aspherical surface coefficient of i-th order (i is an integer of 3 or larger).

Configuration Common to Respective Numerical Examples

Any of eyepiece lenses according to the respective numerical examples below has a configuration that satisfies the above-described basic configuration of the lens. Also, the respective lens surfaces of the first lens L1 and the second lens L2 are aspherical.

Numerical Example 1

Figure 2:
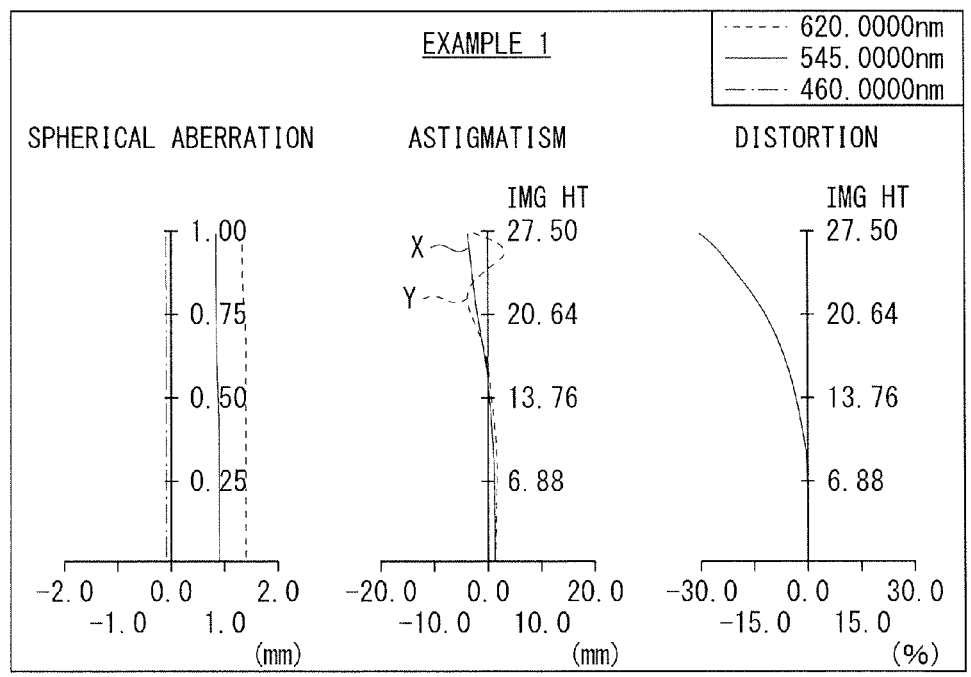
FIG. 2 is an aberration diagram illustrating various aberrations of the eyepiece lens corresponding to Numerical example 1.

Tables 1 and 2 show specific lens data corresponding to an eyepiece lens 1 according to a first configuration example shown in FIG. 1. In particular, Table 1 shows basic lens data thereof, and Table 2 shows data related to aspherical surfaces. FIG. 2 shows spherical aberration, astigmatism, and distortion as various aberrations of the eyepiece lens 1 according to this Numerical example 1. Each aberration is obtained by tracing a light ray from the eye point E.P. side. In each aberration diagram, a solid line shows aberration at a wavelength of 545 nm, a dashed-dotted line shows aberration of at a wavelength of 460 nm, and a dashed line shows aberration at a wavelength of 620 nm. In the astigmatism diagram, X represents aberration in a sagittal direction and Y represents aberration in a meridional direction. The same is applicable to aberration diagrams in Numerical examples 2 to 20 which will be described later.

TABLE 1

Example 1 Lens data

| Si Surface number | Ri Curvature radius | Di Spacing | Ndi Refractive index | vdi Abbe number |
|---|---|---|---|---|
| 1(STO) | ∞ | 15.000 | — | — |
| 2 | 46.914 | 12.800 | 1.635 | 23.9 |
| 3 | 60.825 | 3.602 | — | — |
| 4 | 36.365 | 12.168 | 1.635 | 23.9 |
| 5 | −62.534 | 25.930 | — | — |
| 6 | ∞ | | | |

TABLE 2

Example 1 Aspherical surface data

| Si Surface number | K Conic constant | 4th order | 6th order | 8th order |
|---|---|---|---|---|
| 1(STO) | — | — | — | — |
| 2 | −2.618E+00 | −3.433E−06 | −2.270E−08 | 3.479E−11 |
| 3 | 0.000E+00 | −1.020E−05 | −1.151E−07 | 2.964E−10 |
| 4 | 0.000E+00 | 1.022E−05 | −7.009E−08 | 7.527E−11 |
| 5 | 0.000E+00 | 3.046E−05 | −1.466E−08 | −9.831E−11 |
| 6 | — | — | — | — |

| Si Surface number | 10th order | 12th order | 14th order |
|---|---|---|---|
| 1(STO) | — | — | — |
| 2 | −3.413E−14 | 1.927E−17 | — |
| 3 | −3.391E−13 | 1.587E−16 | −1.098E−20 |
| 4 | −1.229E−15 | −3.096E−17 | 9.859E−21 |
| 5 | 2.217E−13 | −1.766E−16 | 4.900E−20 |
| 6 | — | — | — |

Numerical Example 2

Figure 3:
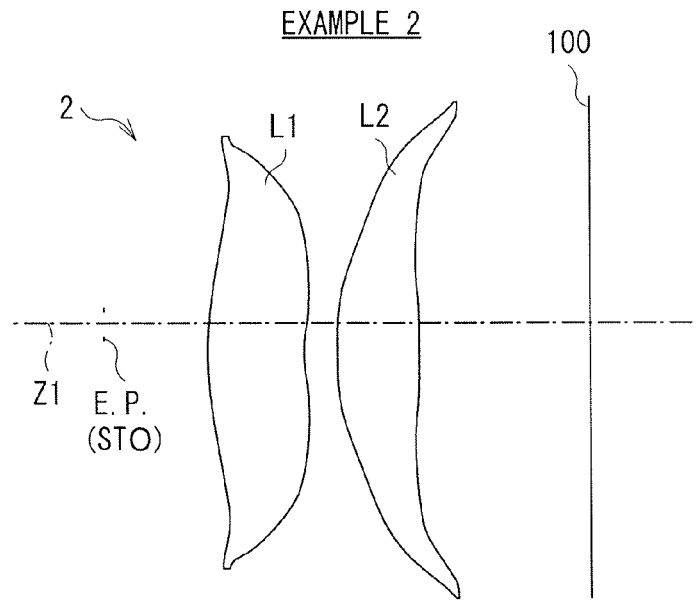
FIG. 3 illustrates a second configuration example of the eyepiece lens according to the embodiment of the present disclosure, and is a cross-sectional view of a lens corresponding to Numerical example 2.
Figure 4:
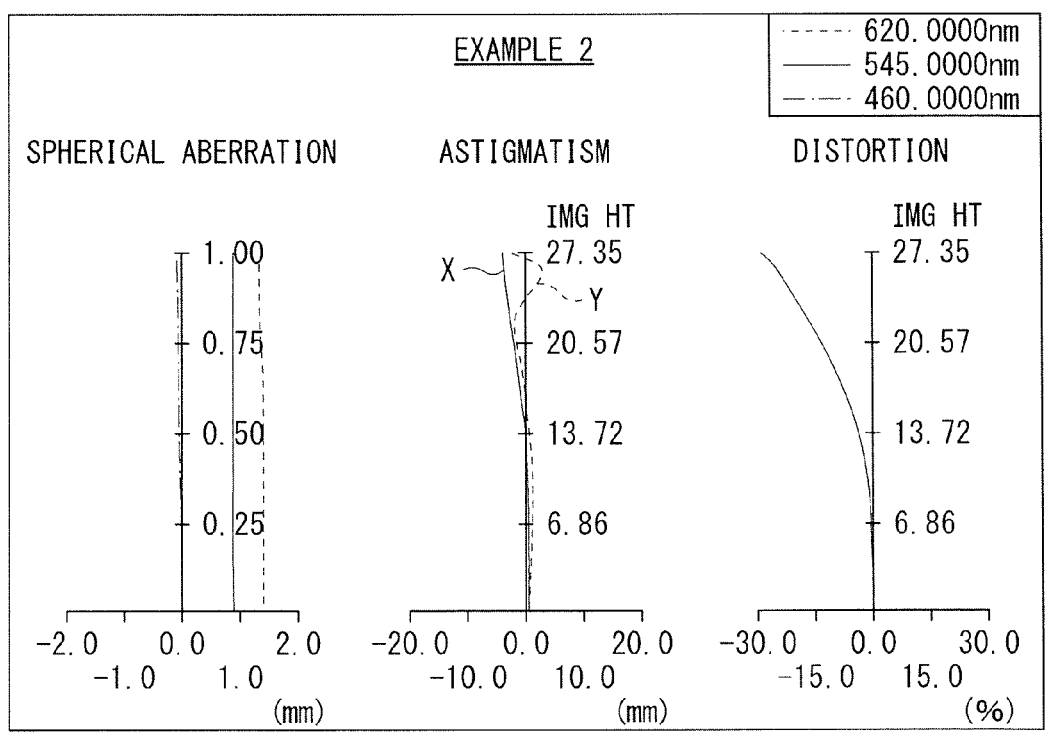
FIG. 4 is an aberration diagram illustrating various aberrations of the eyepiece lens corresponding to Numerical example 2.

Tables 3 and 4 show specific lens data corresponding to an eyepiece lens 2 according to a second configuration example shown in FIG. 3. In particular, Table 3 shows basic lens data thereof, and Table 4 shows data related to aspherical surfaces. FIG. 4 shows various aberrations of the eyepiece lens 2 according to this Numerical example 2.

TABLE 3

Example 2 Lens data

| Si Surface number | Ri Curvature radius | Di Spacing | Ndi Refractive index | vdi Abbe number |
|---|---|---|---|---|
| 1(STO) | ∞ | 15.000 | — | — |
| 2 | 55.851 | 14.000 | 1.635 | 23.9 |
| 3 | 150.500 | 4.301 | — | — |
| 4 | 39.257 | 12.000 | 1.635 | 23.9 |
| 5 | −78.969 | 24.699 | — | — |
| 6 | ∞ | | | |

TABLE 4

Example 2 Aspherical surface data

| Si Surface number | K Conic constant | 4th order | 6th order | 8th order |
|---|---|---|---|---|
| 1(STO) | — | — | — | — |
| 2 | 1.488E−01 | −3.724E−06 | −1.138E−08 | 1.017E−11 |
| 3 | 0.000E+00 | −8.678E−06 | −4.739E−08 | 1.030E−10 |
| 4 | 0.000E+00 | 4.551E−06 | −2.078E−08 | −1.761E−11 |
| 5 | 0.000E+00 | 2.271E−05 | 5.883E−09 | −1.487E−10 |
| 6 | — | — | — | — |

| Si Surface number | 10th order | 12th order | 14th order |
|---|---|---|---|
| 1(STO) | — | — | — |
| 2 | −8.141E−15 | 4.959E−18 | — |
| 3 | −9.802E−14 | 3.343E−17 | — |
| 4 | 7.001E−14 | −4.761E−17 | 8.243E−21 |
| 5 | 2.977E−13 | −2.268E−16 | 6.013E−20 |
| 6 | — | — | — |

Numerical Example 3

Figure 5:
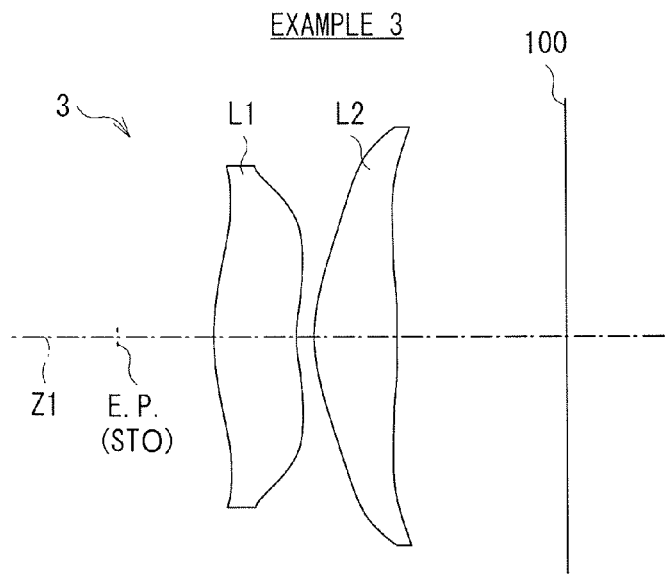
FIG. 5 illustrates a third configuration example of the eyepiece lens according to the embodiment of the present disclosure, and is a cross-sectional view of a lens corresponding to Numerical example 3.
Figure 6:
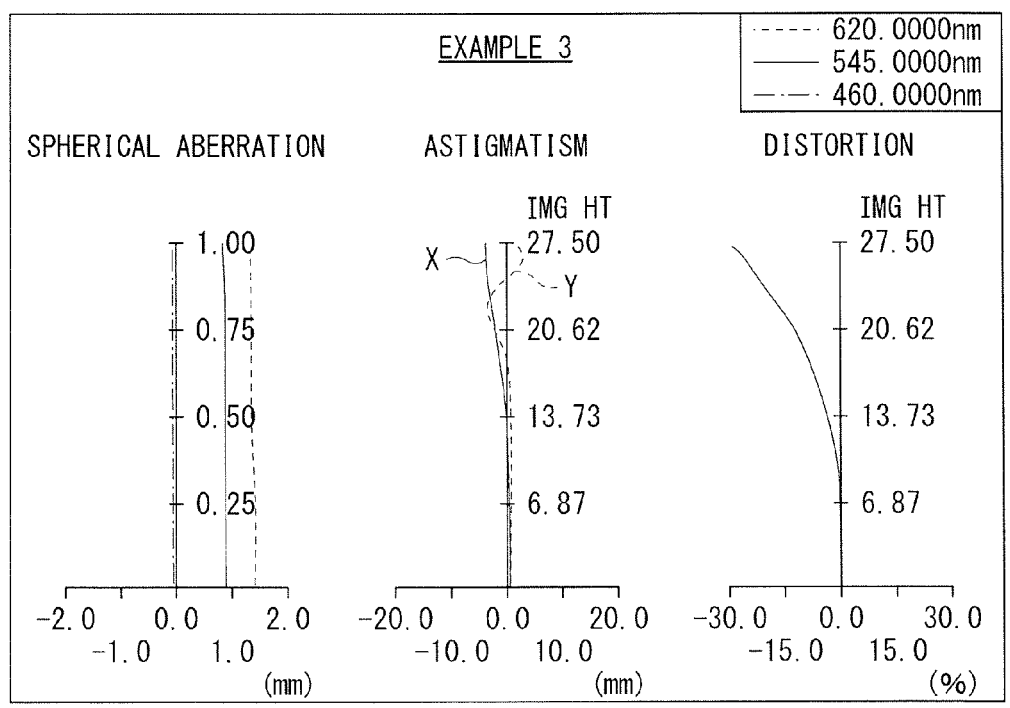
FIG. 6 is an aberration diagram illustrating various aberrations of the eyepiece lens corresponding to Numerical example 3.

Tables 5 and 6 show specific lens data corresponding to an eyepiece lens 3 according to a third configuration example shown in FIG. 5. In particular, Table 5 shows basic lens data thereof, and Table 6 shows data related to aspherical surfaces. FIG. 6 shows various aberrations of the eyepiece lens 3 according to this Numerical example 3.

TABLE 5

Example 3 Lens data

| Si Surface number | Ri Curvature radius | Di Spacing | Ndi Refractive index | vdi Abbe number |
|---|---|---|---|---|
| 1(STO) | ∞ | 15.000 | — | — |
| 2 | 48.810 | 12.800 | 1.583 | 29.9 |
| 3 | 64.615 | 2.708 | — | — |
| 4 | 36.780 | 12.865 | 1.635 | 23.9 |
| 5 | −59.704 | 26.128 | — | — |
| 6 | ∞ | | | |

TABLE 6

Example 3 Aspherical surface data

| Si Surface number | K Conic constant | 4th order | 6th order | 8th order |
|---|---|---|---|---|
| 1(STO) | — | — | — | — |
| 2 | −2.326E+00 | −4.741E−06 | −2.200E−09 | −2.969E−11 |
| 3 | 0.000E+00 | −1.242E−05 | −7.723E−08 | 1.221E−10 |
| 4 | 0.000E+00 | 7.153E−06 | −6.561E−08 | 7.711E−11 |
| 5 | 0.000E+00 | 2.750E−05 | −2.177E−08 | −5.725E−11 |
| 6 | — | — | — | — |

| Si Surface number | 10th order | 12th order | 14th order |
|---|---|---|---|
| 1(STO) | — | — | — |
| 2 | 3.706E−14 | −3.971E−18 | — |
| 3 | 3.895E−14 | −2.663E−16 | 1.851E−19 |
| 4 | −8.722E−15 | −2.588E−17 | 8.954E−21 |
| 5 | 1.574E−13 | −1.322E−16 | 3.737E−20 |
| 6 | — | — | — |

Numerical Example 4

Figure 7:
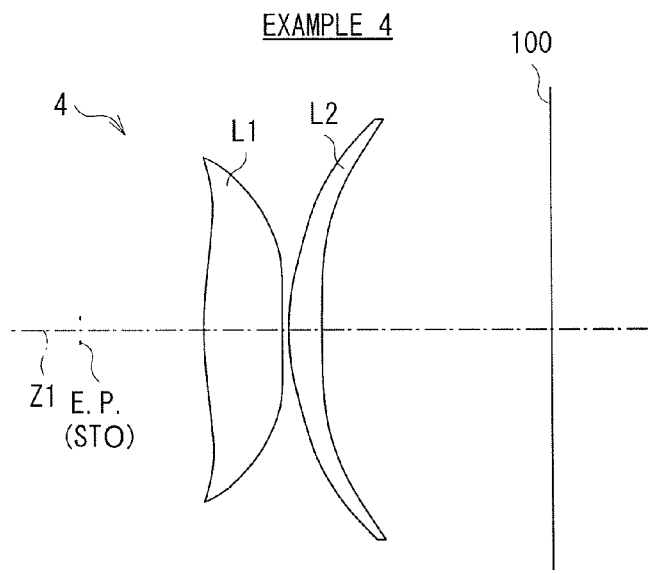
FIG. 7 illustrates a fourth configuration example of the eyepiece lens according to the embodiment of the present disclosure, and is a cross-sectional view of a lens corresponding to Numerical example 4.
Figure 8:
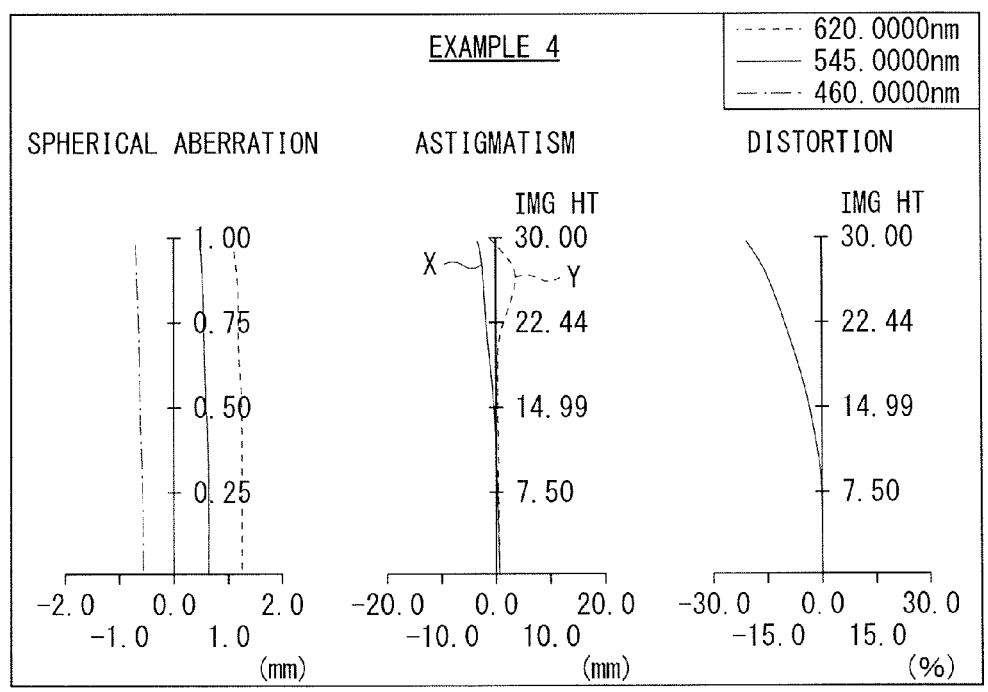
FIG. 8 is an aberration diagram illustrating various aberrations of the eyepiece lens corresponding to Numerical example 4.

Tables 7 and 8 show specific lens data corresponding to an eyepiece lens 4 according to a fourth configuration example shown in FIG. 7. In particular, Table 7 shows basic lens data thereof, and Table 8 shows data related to aspherical surfaces. FIG. 8 shows various aberrations of the eyepiece lens 4 according to this Numerical example 4.

TABLE 7

Example 4 Lens data

| Si Surface number | Ri Curvature radius | Di Spacing | Ndi Refractive index | vdi Abbe number |
|---|---|---|---|---|
| 1(STO) | ∞ | 20.000 | — | — |
| 2 | 100.809 | 12.289 | 1.635 | 23.3 |
| 3 | −18926.617 | 0.800 | — | — |
| 4 | 40.785 | 5.105 | 1.635 | 23.3 |
| 5 | −226.714 | 36.306 | — | — |
| 6 | ∞ | | | |

TABLE 8

Example 4 Aspherical surface data

| Si Surface number | K Conic constant | 4th order | 6th order | 8th order |
|---|---|---|---|---|
| 1(STO) | — | — | — | — |
| 2 | −9.662E+00 | 5.698E−06 | −4.714E−08 | 7.808E−11 |
| 3 | 0.000E+00 | −3.464E−05 | 2.409E−08 | 1.059E−11 |
| 4 | 0.000E+00 | 2.095E−06 | −4.997E−08 | 1.086E−10 |
| 5 | 0.000E+00 | 4.930E−05 | −1.291E−07 | 1.969E−10 |
| 6 | — | — | — | — |

| Si Surface number | 10th order | 12th order | 14th order |
|---|---|---|---|
| 1(STO) | — | — | — |
| 2 | −6.789E−14 | 2.605E−17 | — |
| 3 | −4.489E−14 | 2.499E−17 | — |
| 4 | −8.617E−14 | 2.221E−17 | 7.950E−22 |
| 5 | −1.503E−13 | 4.695E−17 | −2.614E−21 |
| 6 | — | — | — |

Numerical Example 5

Figure 9:
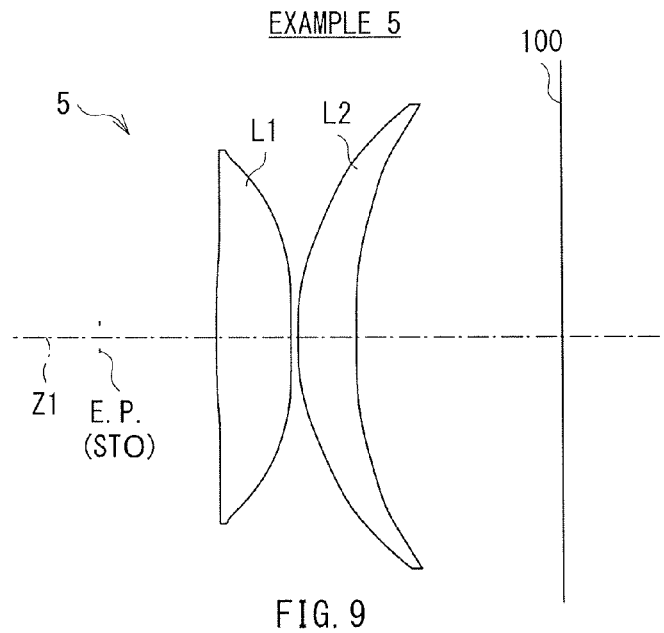
FIG. 9 illustrates a fifth configuration example of the eyepiece lens according to the embodiment of the present disclosure, and is a cross-sectional view of a lens corresponding to Numerical example 5.
Figure 10:
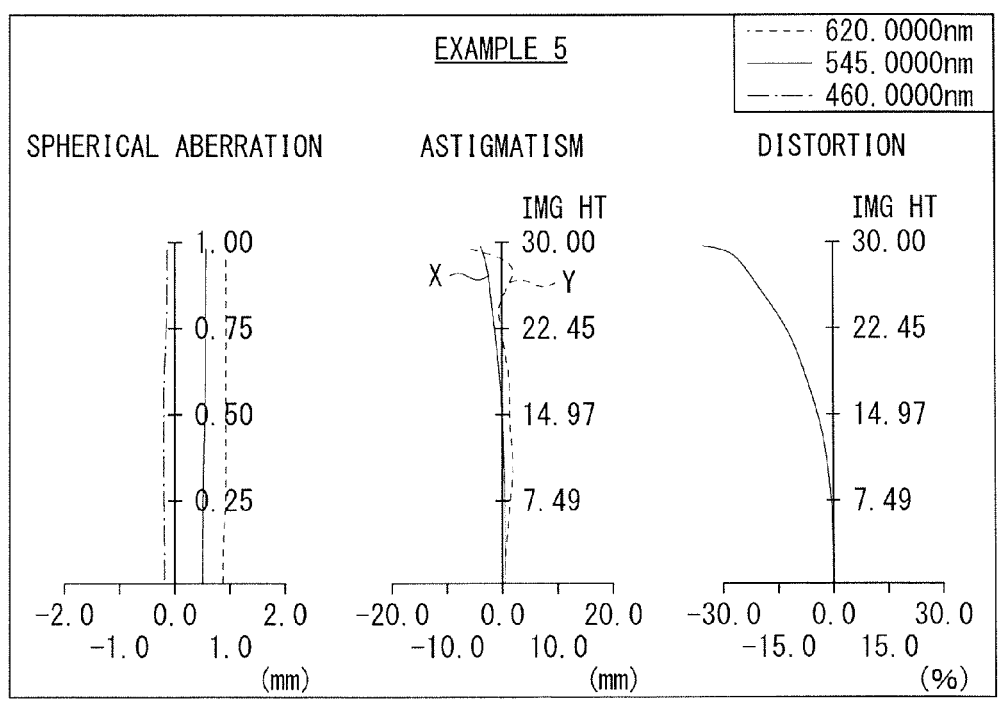
FIG. 10 is an aberration diagram illustrating various aberrations of the eyepiece lens corresponding to Numerical example 5.

Tables 9 and 10 show specific lens data corresponding to an eyepiece lens 5 according to a fifth configuration example shown in FIG. 9. In particular, Table 9 shows basic lens data thereof, and Table 10 shows data related to aspherical surfaces. FIG. 10 shows various aberrations of the eyepiece lens 5 according to this Numerical example 5.

TABLE 9

Example 5 Lens data

| Si Surface number | Ri Curvature radius | Di Spacing | Ndi Refractive index | νdi Abbe number |
|---|---|---|---|---|
| 1(STO) | ∞ | 18.000 | — | — |
| 2 | 153.562 | 11.634 | 1.711 | 36.1 |
| 3 | −2111.000 | 0.950 | — | — |
| 4 | 37.164 | 9.452 | 1.711 | 36.1 |
| 5 | −296.460 | 31.949 | — | — |
| 6 | ∞ | | | |

TABLE 10

Example 5 Aspherical surface data

| Si Surface number | K Conic constant | 4th order | 6th order | 8th order |
|---|---|---|---|---|
| 1(STO) | — | — | — | — |
| 2 | 8.539E+00 | −1.172E−05 | 4.406E−08 | −9.444E−11 |
| 3 | 0.000E+00 | −3.180E−05 | 2.855E−08 | 2.389E−11 |
| 4 | 0.000E+00 | −4.047E−06 | 1.860E−08 | −8.617E−11 |
| 5 | 0.000E+00 | 3.385E−05 | −2.089E−08 | −1.166E−10 |
| 6 | — | — | — | — |

| Si Surface number | 10th order | 12th order | 14th order |
|---|---|---|---|
| 1(STO) | — | — | — |
| 2 | 8.544E−14 | −2.585E−17 | — |
| 3 | −7.904E−14 | 4.713E−17 | — |
| 4 | 1.252E−13 | −7.111E−17 | 1.279E−20 |
| 5 | 2.488E−13 | −1.817E−16 | 4.574E−20 |
| 6 | — | — | — |

Numerical Example 6

Figure 11:
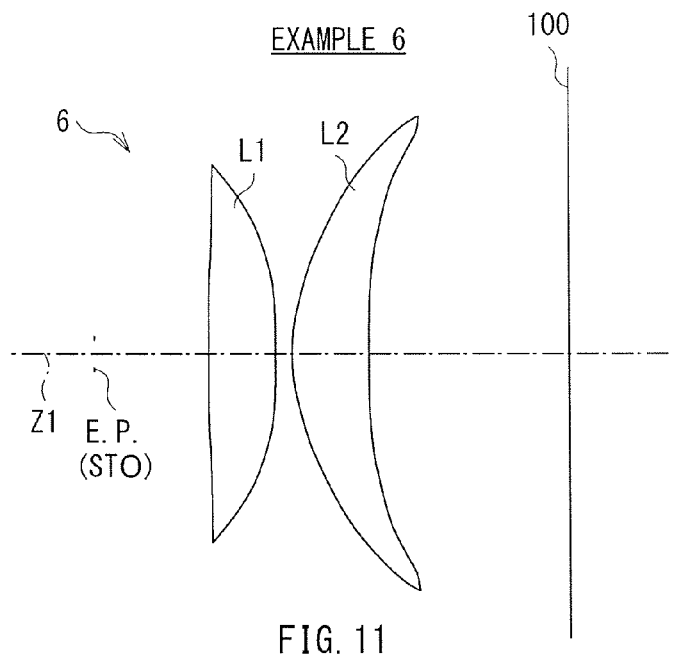
FIG. 11 illustrates a sixth configuration example of the eyepiece lens according to the embodiment of the present disclosure, and is a cross-sectional view of a lens corresponding to Numerical example 6.
Figure 12:
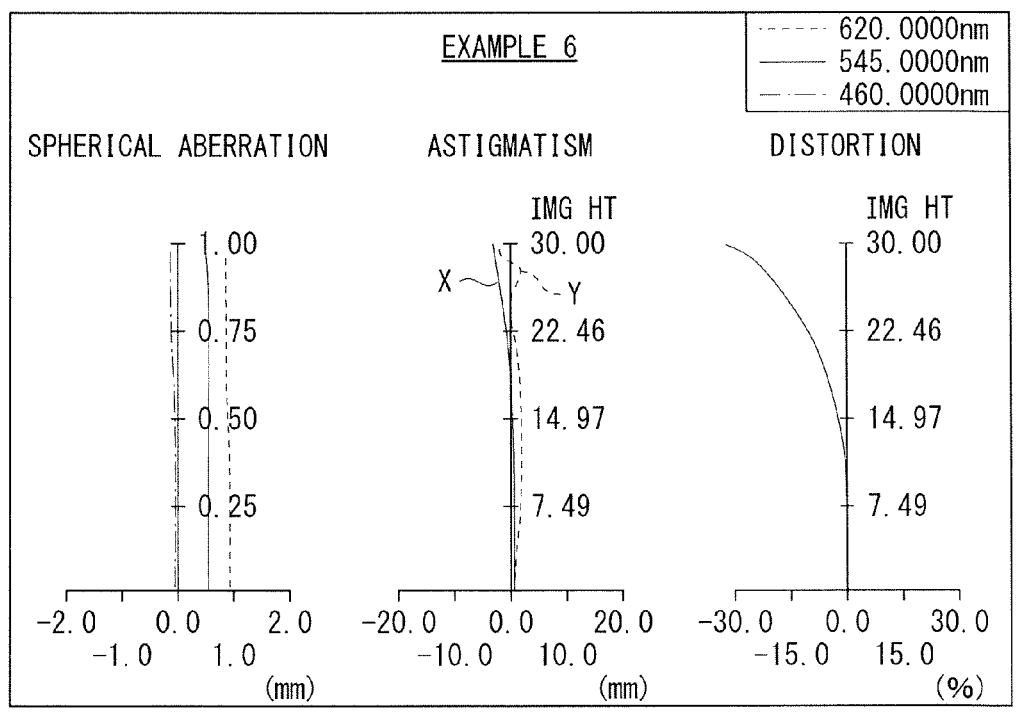
FIG. 12 is an aberration diagram illustrating various aberrations of the eyepiece lens corresponding to Numerical example 6.

Tables 11 and 12 show specific lens data corresponding to an eyepiece lens 6 according to a sixth configuration example shown in FIG. 11. In particular, Table 11 shows basic lens data thereof, and Table 12 shows data related to aspherical surfaces. FIG. 12 shows various aberrations of the eyepiece lens 6 according to this Numerical example 6.

TABLE 11

Example 6 Lens data

| Si Surface number | Ri Curvature radius | Di Spacing | Ndi Refractive index | νdi Abbe number |
|---|---|---|---|---|
| 1(STO) | ∞ | 17.400 | — | — |
| 2 | 153.576 | 10.074 | 1.671 | 38.1 |
| 3 | −2111.000 | 3.056 | — | — |
| 4 | 37.242 | 11.698 | 1.671 | 38.1 |
| 5 | −160.984 | 30.872 | — | — |
| 6 | ∞ | | | |

TABLE 12

Example 6 Aspherical surface data

| Si Surface number | K Conic constant | 4th order | 6th order | 8th order |
|---|---|---|---|---|
| 1(STO) | — | — | — | — |
| 2 | 6.120E−01 | −1.294E−05 | 4.329E−08 | −7.928E−11 |
| 3 | 0.000E+00 | −2.707E−05 | 1.943E−09 | 9.476E−11 |
| 4 | 0.000E+00 | 1.242E−06 | −1.769E−08 | 1.198E−11 |
| 5 | 0.000E+00 | 3.200E−05 | −2.848E−08 | −7.550E−11 |
| 6 | — | — | — | — |

| Si Surface number | 10th order | 12th order | 14th order |
|---|---|---|---|
| 1(STO) | — | — | — |
| 2 | 6.394E−14 | −1.748E−17 | — |
| 3 | −1.580E−13 | 7.774E−17 | — |
| 4 | 5.364E−15 | −3.079E−18 | −1.926E−21 |
| 5 | 1.885E−13 | −1.445E−16 | 3.729E−20 |
| 6 | — | — | — |

Numerical Example 7

Figure 13:
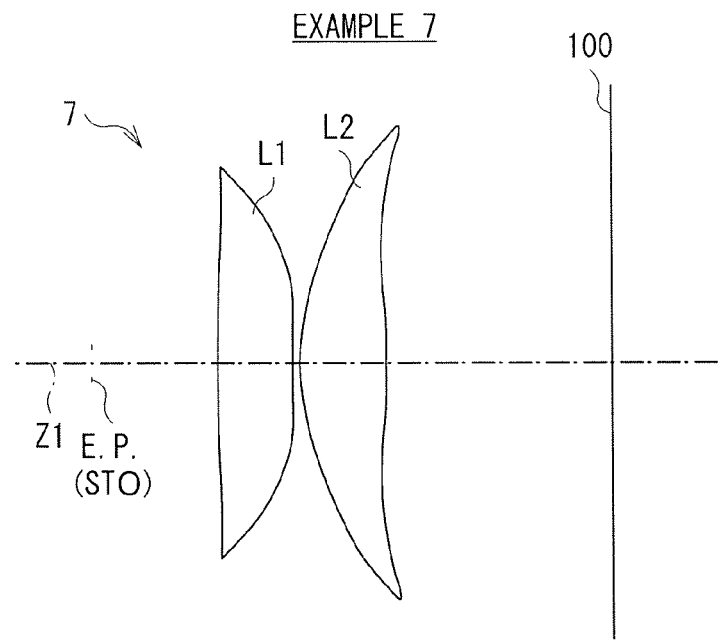
FIG. 13 illustrates a seventh configuration example of the eyepiece lens according to the embodiment of the present disclosure, and is a cross-sectional view of a lens corresponding to Numerical example 7.
Figure 14:
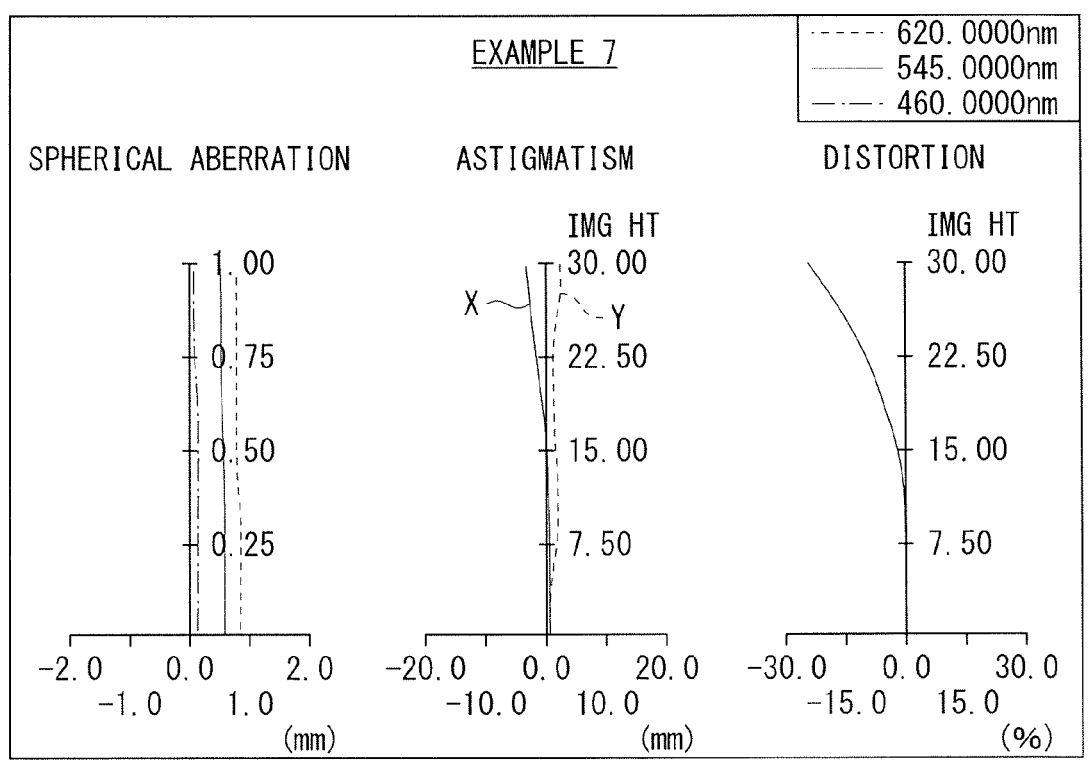
FIG. 14 is an aberration diagram illustrating various aberrations of the eyepiece lens corresponding to Numerical example 7.

Tables 13 and 14 show specific lens data corresponding to an eyepiece lens 7 according to a seventh configuration example shown in FIG. 13. In particular, Table 13 shows basic lens data thereof, and Table 14 shows data related to aspherical surfaces. FIG. 14 shows various aberrations of the eyepiece lens 7 according to this Numerical example 7.

TABLE 13

Example 7 Lens data

| Si Surface number | Ri Curvature radius | Di Spacing | Ndi Refractive index | νdi Abbe number |
|---|---|---|---|---|
| 1(STO) | ∞ | 18.000 | — | — |
| 2 | 146.340 | 11.079 | 1.525 | 56.5 |
| 3 | −2111.000 | 0.950 | — | — |
| 4 | 37.327 | 12.277 | 1.525 | 56.5 |
| 5 | −57.214 | 32.193 | — | — |
| 6 | ∞ | | | |

TABLE 14

Example 7 Aspherical surface data

| Si Surface number | K Conic constant | 4th order | 6th order | 8th order |
|---|---|---|---|---|
| 1(STO) | — | — | — | — |
| 2 | 7.792E+00 | −8.499E−06 | 2.916E−08 | −7.853E−11 |
| 3 | 0.000E+00 | −3.027E−05 | 9.022E−09 | 5.893E−11 |
| 4 | 0.000E+00 | −6.515E−06 | 1.375E−09 | −1.402E−11 |
| 5 | 0.000E+00 | 3.350E−05 | −3.601E−08 | −3.005E−11 |
| 6 | — | — | — | — |

| Si Surface number | 10th order | 12th order | 14th order |
|---|---|---|---|
| 1(STO) | — | — | — |
| 2 | 9.198E−14 | −3.702E−17 | — |
| 3 | −1.100E−13 | 5.857E−17 | — |
| 4 | 3.303E−14 | −2.451E−17 | 5.070E−21 |
| 5 | 1.131E−13 | −9.668E−17 | 2.728E−20 |
| 6 | — | — | — |

Numerical Example 8

Figure 15:
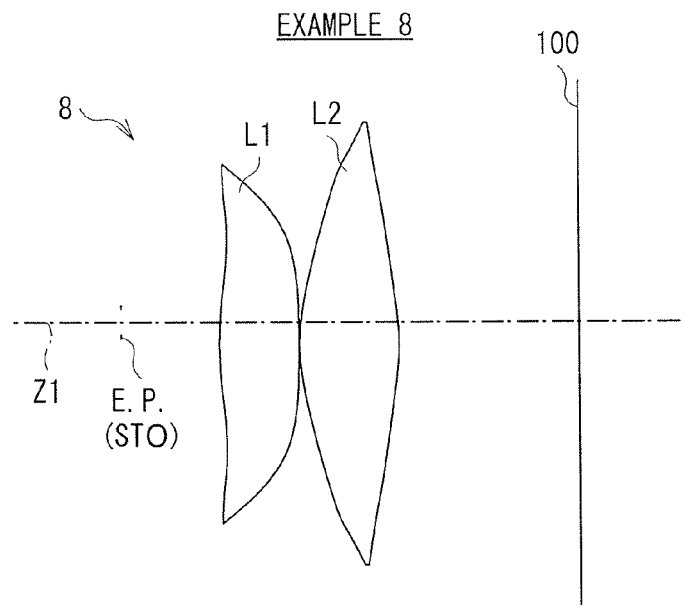
FIG. 15 illustrates an eighth configuration example of the eyepiece lens according to the embodiment of the present disclosure, and is a cross-sectional view of a lens corresponding to Numerical example 8.
Figure 16:
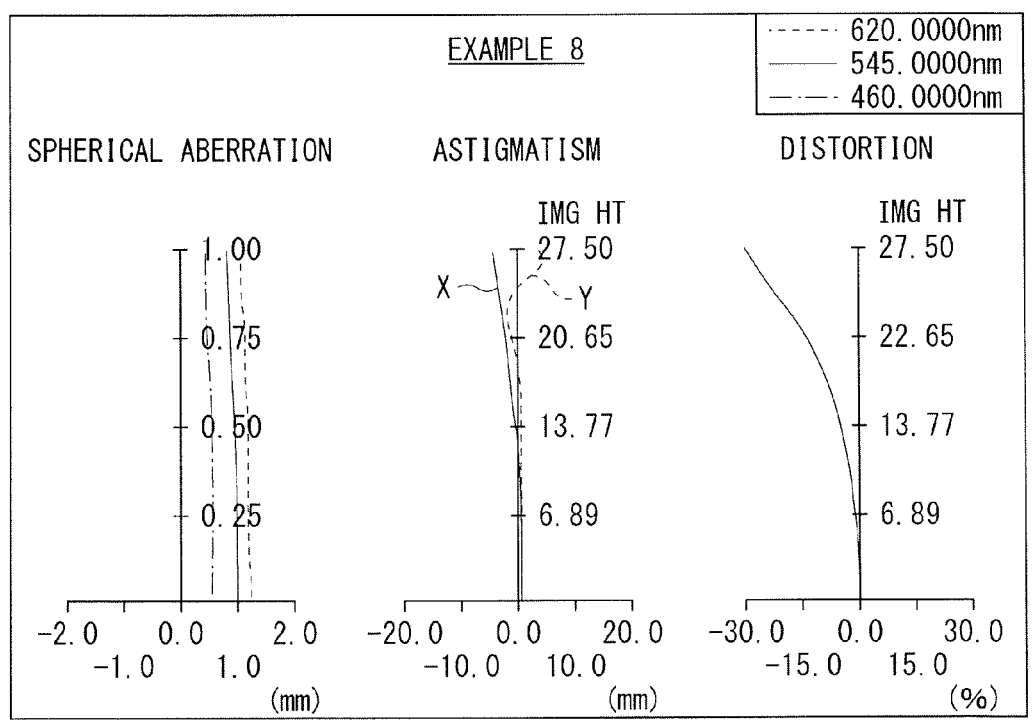
FIG. 16 is an aberration diagram illustrating various aberrations of the eyepiece lens corresponding to Numerical example 8.

Tables 15 and 16 show specific lens data corresponding to an eyepiece lens 8 according to an eighth configuration example shown in FIG. 15. In particular, Table 15 shows basic lens data thereof, and Table 16 shows data related to aspherical surfaces. FIG. 16 shows various aberrations of the eyepiece lens 8 according to this Numerical example 8.

TABLE 15

Example 8 Lens data

| Si Surface number | Ri Curvature radius | Di Spacing | Ndi Refractive index | νdi Abbe number |
|---|---|---|---|---|
| 1(STO) | ∞ | 15.000 | — | — |
| 2 | 110.372 | 11.400 | 1.525 | 56.5 |
| 3 | −2688.936 | 0.500 | — | — |
| 4 | 40.027 | 15.000 | 1.525 | 56.5 |
| 5 | −46.000 | 27.432 | — | — |
| 6 | ∞ | | | |

TABLE 16

Example 8 Aspherical surface data

| Si Surface number | K Conic constant | 4th order | 6th order | 8th order |
|---|---|---|---|---|
| 1(STO) | — | — | — | — |
| 2 | 4.124E+00 | 4.453E−06 | −6.757E−08 | 1.401E−10 |
| 3 | 0.0000E+00 | −6.938E−06 | −5.398E−08 | −1.010E−10 |
| 4 | 0.0000E+00 | 7.271E−06 | −8.372E−08 | 1.528E−10 |
| 5 | 0.0000E+00 | 2.043E−05 | 2.066E−08 | −2.103E−10 |
| 6 | — | — | — | — |

| Si Surface number | 10th order | 12th order | 14th order |
|---|---|---|---|
| 1(STO) | — | — | — |
| 2 | −1.387E−13 | 6.155E−17 | — |
| 3 | 7.131E−13 | −1.101E−15 | 5.570E−19 |
| 4 | −1.092E−13 | 2.576E−17 | 6.437E−22 |
| 5 | 4.054E−13 | −3.200E−16 | 9.181E−20 |
| 6 | — | — | — |

Numerical Example 9

Figure 17:
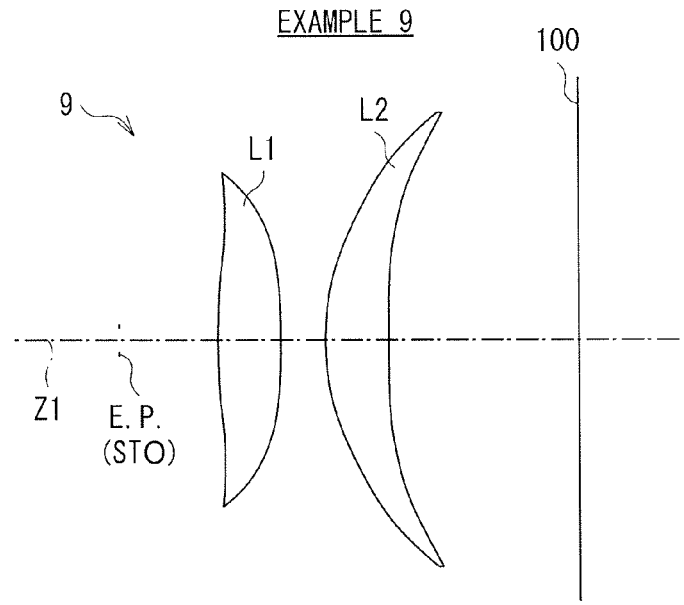
FIG. 17 illustrates a ninth configuration example of the eyepiece lens according to the embodiment of the present disclosure, and is a cross-sectional view of a lens corresponding to Numerical example 9.
Figure 18:
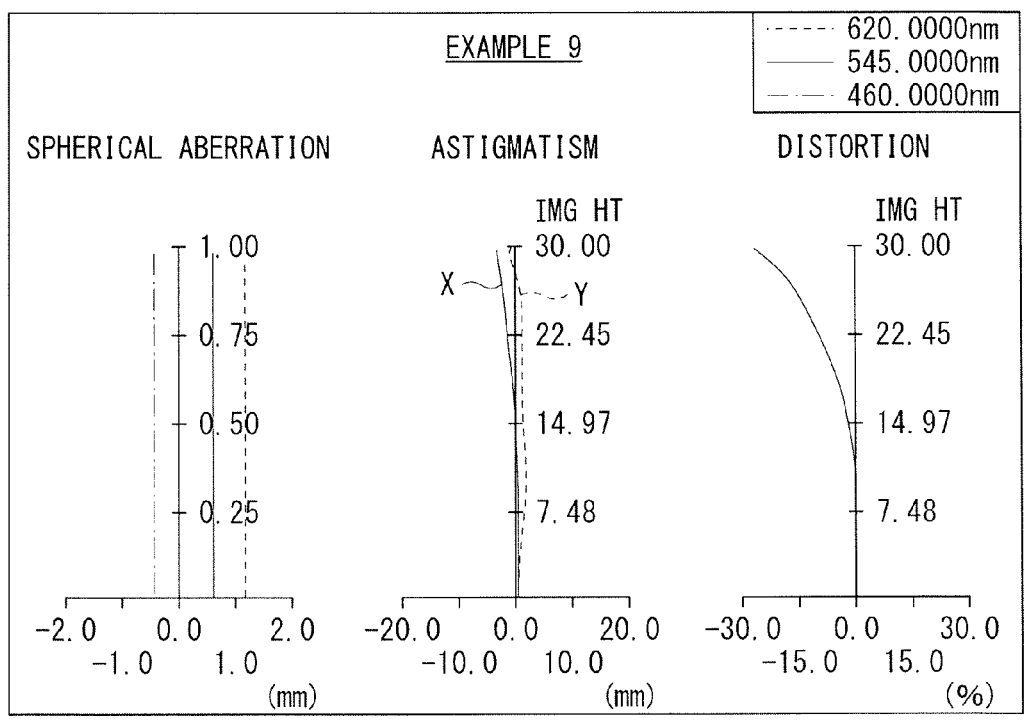
FIG. 18 is an aberration diagram illustrating various aberrations of the eyepiece lens corresponding to Numerical example 9.

Tables 17 and 18 show specific lens data corresponding to an eyepiece lens 9 according to a ninth configuration example shown in FIG. 17. In particular, Table 17 shows basic lens data thereof, and Table 18 shows data related to aspherical surfaces. FIG. 18 shows various aberrations of the eyepiece lens 9 according to this Numerical example 9.

TABLE 17

Example 9 Lens data

| Si Surface number | Ri Curvature radius | Di Spacing | Ndi Refractive index | νdi Abbe number |
|---|---|---|---|---|
| 1(STO) | ∞ | 15.000 | — | — |
| 2 | 80.888 | 9.174 | 1.635 | 23.8 |
| 3 | −2111.000 | 6.962 | — | — |
| 4 | 39.907 | 9.813 | 1.635 | 23.8 |
| 5 | −152.103 | 28.831 | — | — |
| 6 | ∞ | | | |

TABLE 18

Example 9 Aspherical surface data

| Si Surface number | K Conic constant | 4th order | 6th order | 8th order |
|---|---|---|---|---|
| 1(STO) | — | — | — | — |
| 2 | −9.504E+00 | −1.782E−05 | 4.992E−08 | −9.274E−11 |
| 3 | 0.000E+00 | −2.991E−05 | 1.221E−08 | 5.392E−11 |
| 4 | 0.000E+00 | 4.280E−06 | −8.462E−09 | −3.860E−11 |
| 5 | 0.000E+00 | 3.109E−05 | −2.194E−08 | −9.264E−11 |
| 6 | — | — | — | — |

| Si Surface number | 10th order | 12th order | 14th order |
|---|---|---|---|
| 1(STO) | — | — | — |
| 2 | 8.076E−14 | −2.601E−17 | — |
| 3 | −1.127E−13 | 5.840E−17 | — |
| 4 | 1.020E−13 | −8.304E−17 | 2.224E−20 |
| 5 | 2.302E−13 | −1.912E−16 | 5.451E−20 |
| 6 | — | — | — |

Numerical Example 10

Figure 19:
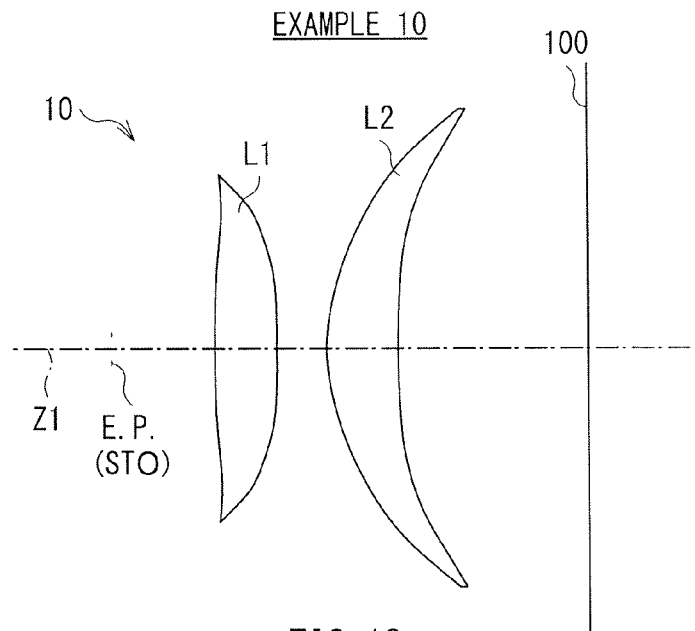
FIG. 19 illustrates a tenth configuration example of the eyepiece lens according to the embodiment of the present disclosure, and is a cross-sectional view of a lens corresponding to Numerical example 10.
Figure 20:
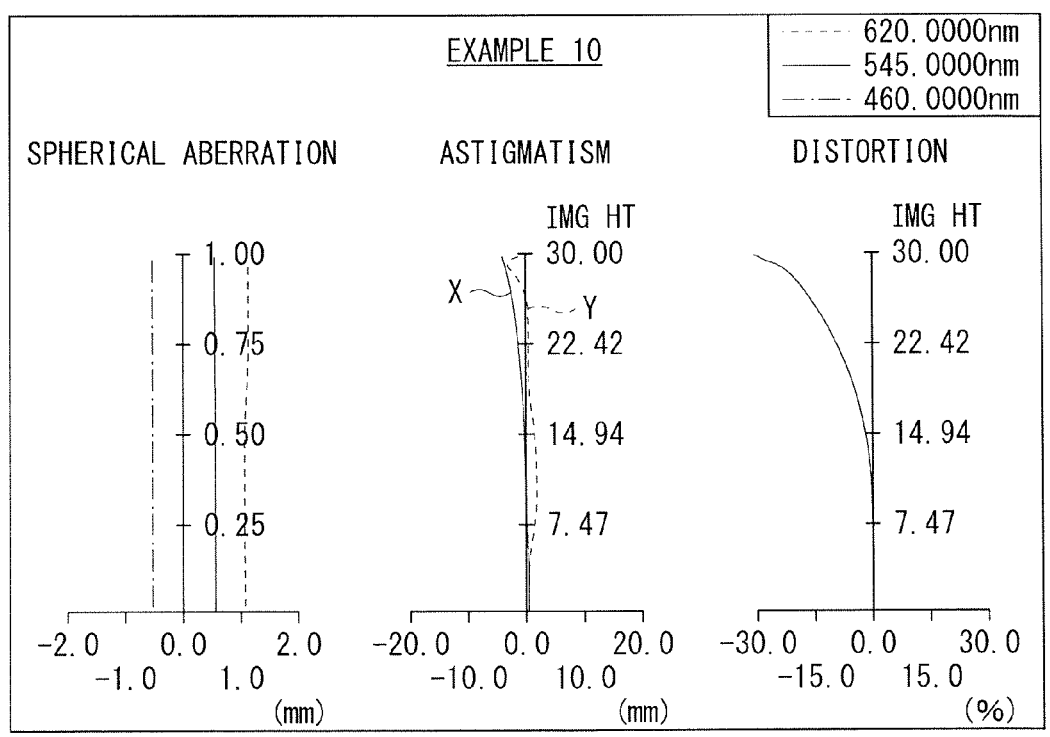
FIG. 20 is an aberration diagram illustrating various aberrations of the eyepiece lens corresponding to Numerical example 10.

Tables 19 and 20 show specific lens data corresponding to an eyepiece lens 10 according to a tenth configuration example shown in FIG. 19. In particular, Table 19 shows basic lens data thereof, and Table 20 shows data related to aspherical surfaces. FIG. 20 shows various aberrations of the eyepiece lens 10 according to this Numerical example 10.

TABLE 19

Example 10 Lens data

| Si Surface number | Ri Curvature radius | Di Spacing | Ndi Refractive index | νdi Abbe number |
|---|---|---|---|---|
| 1(STO) | ∞ | 15.000 | — | — |
| 2 | 83.940 | 9.229 | 1.635 | 23.8 |
| 3 | −505.000 | 7.603 | — | — |
| 4 | 38.796 | 10.548 | 1.635 | 23.8 |
| 5 | −245.812 | 28.297 | — | — |
| 6 | ∞ | | | |

TABLE 20

Example 10 Aspherical surface data

| Si Surface number | K Conic constant | 4th order | 6th order | 8th order |
|---|---|---|---|---|
| 1(STO) | — | — | — | — |
| 2 | −1.752E+00 | −1.885E−05 | 5.987E−08 | −1.235E−10 |
| 3 | 0.000E+00 | −2.458E−05 | −3.361E−09 | 9.641E−11 |
| 4 | 0.000E+00 | 5.787E−06 | −9.122E−10 | −7.800E−11 |
| 5 | 0.000E+00 | 2.954E−05 | 4.183E−09 | −1.921E−10 |
| 6 | — | — | — | — |

| Si Surface number | 10th order | 12th order | 14th order |
|---|---|---|---|
| 1(STO) | — | — | — |
| 2 | 1.156E−13 | −3.854E−17 | — |
| 3 | −1.671E−13 | 8.213E−17 | — |
| 4 | 1.551E−13 | −1.093E−16 | 2.590E−20 |
| 5 | 3.724E−13 | −2.771E−16 | 7.286E−20 |
| 6 | — | — | — |

Numerical Example 11

Figure 21:
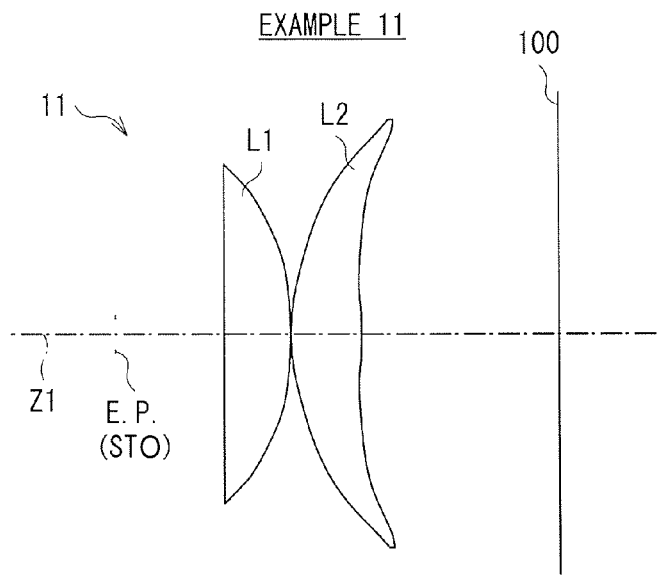
FIG. 21 illustrates an eleventh configuration example of the eyepiece lens according to the embodiment of the present disclosure, and is a cross-sectional view of a lens corresponding to Numerical example 11.
Figure 22:
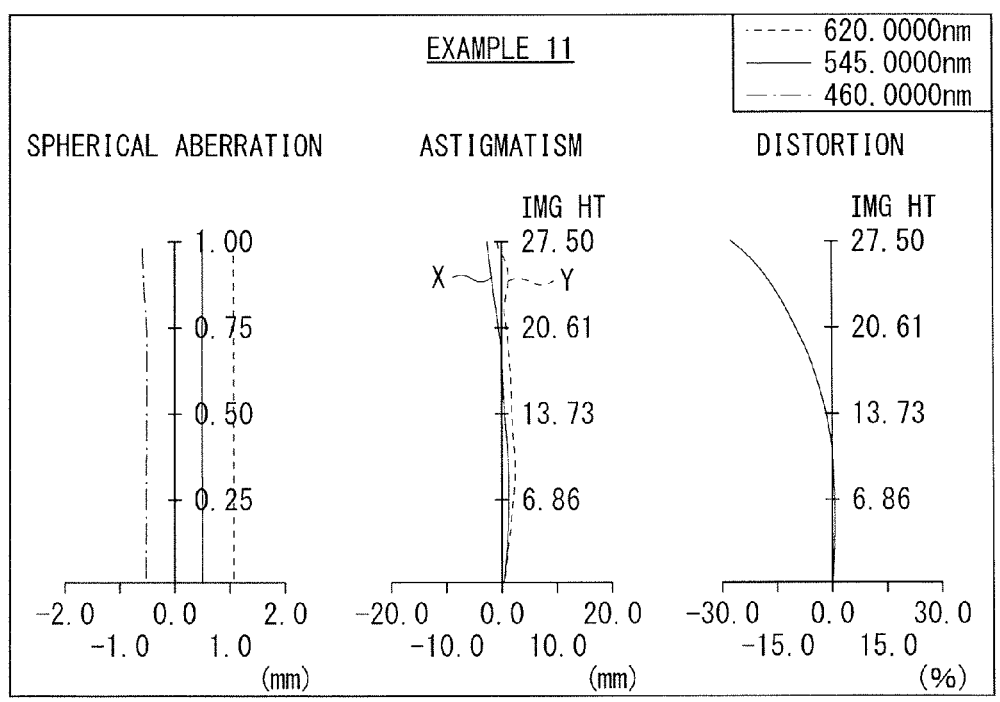
FIG. 22 is an aberration diagram illustrating various aberrations of the eyepiece lens corresponding to Numerical example 11.

Tables 21 and 22 show specific lens data corresponding to an eyepiece lens 11 according to an eleventh configuration example shown in FIG. 21. In particular, Table 21 shows basic lens data thereof, and Table 22 shows data related to aspherical surfaces. FIG. 22 shows various aberrations of the eyepiece lens 11 according to this Numerical example 11.

TABLE 21

Example 11 Lens data

| Si Surface number | Ri Curvature radius | Di Spacing | Ndi Refractive index | νdi Abbe number |
|---|---|---|---|---|
| 1(STO) | ∞ | 17.000 | — | — |
| 2 | 205.244 | 10.142 | 1.583 | 30.0 |
| 3 | −2433.915 | 0.500 | — | — |
| 4 | 36.283 | 10.794 | 1.635 | 23.8 |
| 5 | −84.267 | 30.878 | — | — |
| 6 | ∞ | | | |

TABLE 22

Example 11 Aspherical surface data

| Si Surface number | K Conic constant | 4th order | 6th order | 8th order |
|---|---|---|---|---|
| 1(STO) | — | — | — | — |
| 2 | 4.448E+00 | −1.434E−05 | 5.860E−08 | −1.167E−10 |
| 3 | 0.000E+00 | −5.569E−05 | 9.029E−08 | −3.498E−12 |
| 4 | 0.000E+00 | −1.110E−05 | 9.094E−09 | −7.488E−12 |
| 5 | 0.000E+00 | 5.079E−05 | −1.290E−07 | 1.516E−10 |
| 6 | — | — | — | — |

| Si Surface number | 10th order | 12th order | 14th order |
|---|---|---|---|
| 1(STO) | — | — | — |
| 2 | 9.125E−14 | −1.771E−17 | — |
| 3 | −1.452E−13 | 8.002E−17 | — |
| 4 | 1.475E−14 | −9.468E−18 | −6.250E−22 |
| 5 | −4.062E−14 | −4.558E−17 | 2.382E−20 |
| 6 | — | — | — |

Numerical Example 12

Figure 23:
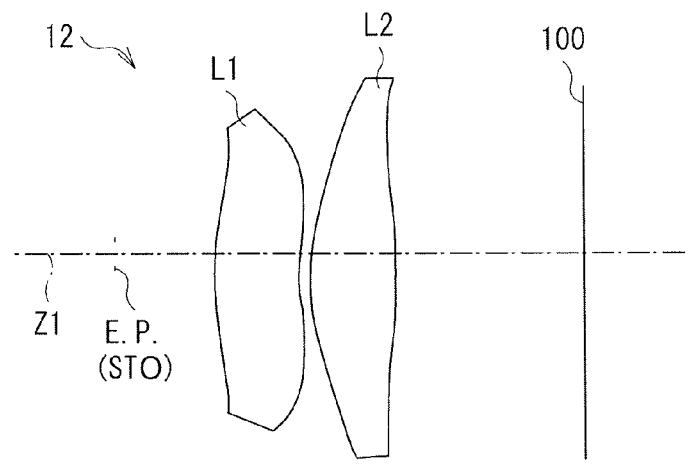
FIG. 23 illustrates a twelfth configuration example of the eyepiece lens according to the embodiment of the present disclosure, and is a cross-sectional view of a lens corresponding to Numerical example 12.
Figure 24:
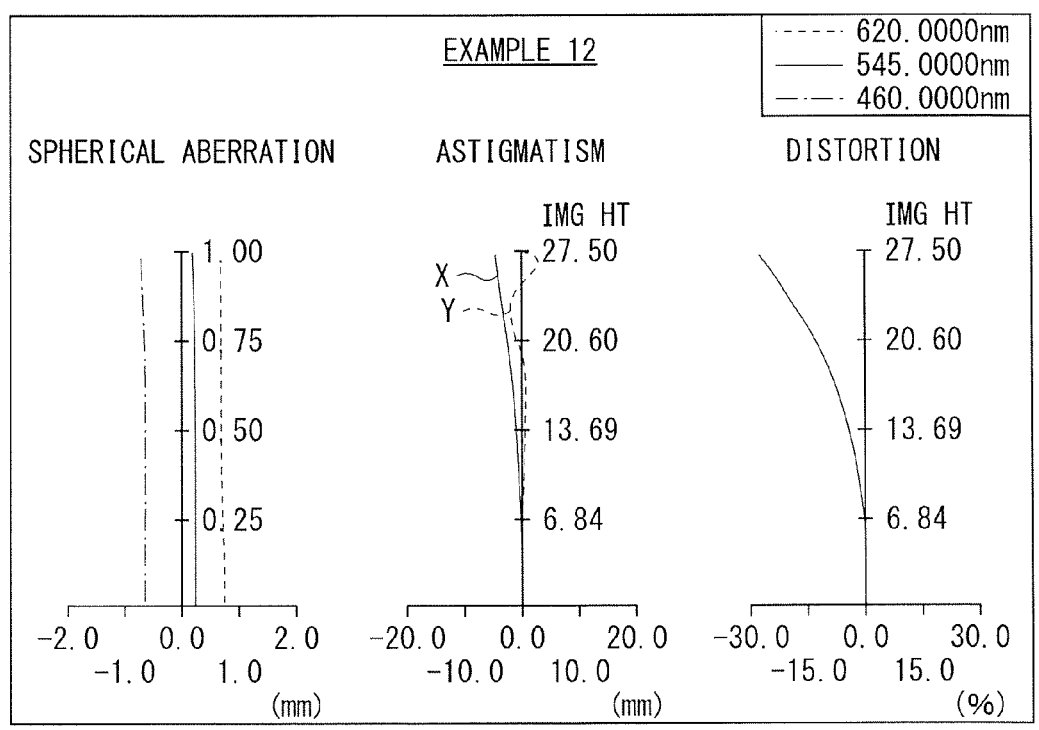
FIG. 24 is an aberration diagram illustrating various aberrations of the eyepiece lens corresponding to Numerical example 12.

Tables 23 and 24 show specific lens data corresponding to an eyepiece lens 12 according to a twelfth configuration example shown in FIG. 23. In particular, Table 23 shows basic lens data thereof, and Table 24 shows data related to aspherical surfaces. FIG. 24 shows various aberrations of the eyepiece lens 12 according to this Numerical example 12.

TABLE 23

Example 12 Lens data

| Si Surface number | Ri Curvature radius | Di Spacing | Ndi Refractive index | νdi Abbe number |
|---|---|---|---|---|
| 1(STO) | ∞ | 17.000 | — | — |
| 2 | 59.884 | 12.800 | 1..525 | 56.6 |
| 3 | 92.469 | 1.400 | — | — |
| 4 | 38.696 | 13.000 | 1.635 | 23.8 |
| 5 | −59.779 | 28.200 | — | — |
| 6 | ∞ | | | |

TABLE 24

Example 12 Aspherical surface data

| Si Surface number | K Conic constant | 4th order | 6th order | 8th order |
|---|---|---|---|---|
| 1(STO) | — | — | — | — |
| 2 | −1.456E+00 | −6.158E−06 | 1.721E−08 | −9.189E−11 |
| 3 | 0.000E+00 | −1.746E−05 | −1.337E−08 | −1.145E−10 |
| 4 | 0.000E+00 | 1.358E−06 | −3.766E−08 | 2.621E−11 |
| 5 | 0.000E+00 | 2.142E−05 | −5.434E−09 | −9.690E−11 |
| 6 | — | — | — | — |

| Si Surface number | 10th order | 12th order | 14th order |
|---|---|---|---|
| 1(STO) | — | — | — |
| 2 | 1.113E−13 | −3.197E−17 | — |
| 3 | 4.981E−13 | −7.563E−16 | 4.077E−19 |
| 4 | 3.839E−14 | −4.630E−17 | 1.181E−20 |
| 5 | 2.119E−13 | −1.669E−16 | 4.507E−20 |
| 6 | — | — | — |

Numerical Example 13

Figure 25:
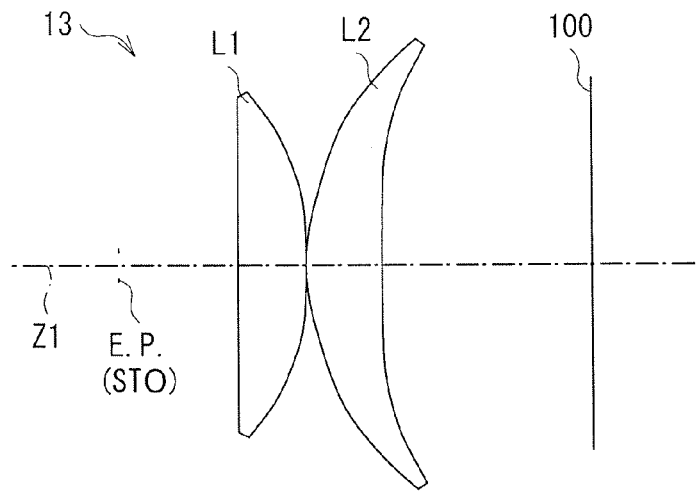
FIG. 25 illustrates a thirteenth configuration example of the eyepiece lens according to the embodiment of the present disclosure, and is a cross-sectional view of a lens corresponding to Numerical example 13.
Figure 26:
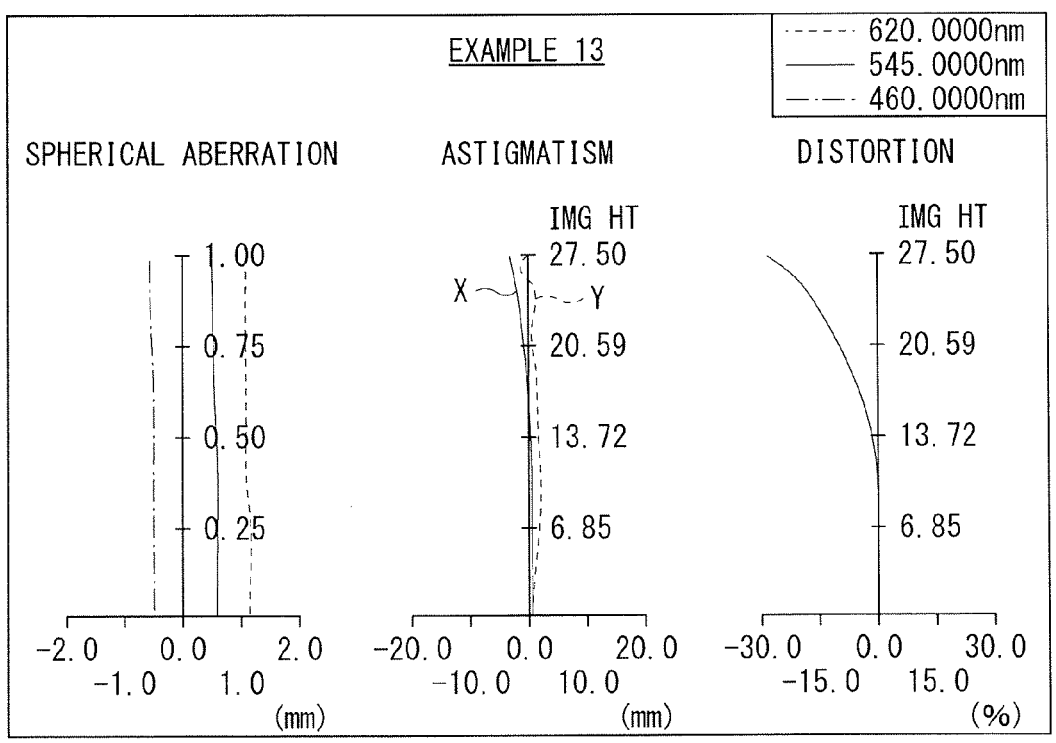
FIG. 26 is an aberration diagram illustrating various aberrations of the eyepiece lens corresponding to Numerical example 13.

Tables 25 and 26 show specific lens data corresponding to an eyepiece lens 13 according to a thirteenth configuration example shown in FIG. 25. In particular, Table 25 shows basic lens data thereof, and Table 26 shows data related to aspherical surfaces. FIG. 26 shows various aberrations of the eyepiece lens 13 according to this Numerical example 13.

TABLE 25

Example 13 Lens data

| Si Surface number | Ri Curvature radius | Di Spacing | Ndi Refractive index | νdi Abbe number |
|---|---|---|---|---|
| 1(STO) | ∞ | 17.000 | — | — |
| 2 | 232.354 | 10.011 | 1.583 | 30.0 |
| 3 | −14888.000 | 0.300 | — | — |
| 4 | 35.148 | 11.244 | 1.635 | 23.3 |
| 5 | −88.824 | 31.078 | — | — |
| 6 | ∞ | | | |

TABLE 26

Example 13 Aspherical surface data

| Si Surface number | K Conic constant | 4th order | 6th order | 8th order |
|---|---|---|---|---|
| 1(STO) | — | — | — | — |
| 2 | −7.582E+00 | −1.567E−05 | 6.242E−08 | −1.140E−10 |
| 3 | 0.000E+00 | −5.894E−05 | 1.071E−07 | −5.249E−11 |
| 4 | 0.000E+00 | −1.314E−05 | 2.064E−08 | −3.726E−11 |
| 5 | 0.000E+00 | 5.183E−05 | −1.314E−07 | 1.518E−10 |
| 6 | — | — | — | — |

| Si Surface number | 10th order | 12th order | 14th order |
|---|---|---|---|
| 1(STO) | — | — | — |
| 2 | 8.326E−14 | −1.491E−17 | — |
| 3 | −5.120E−14 | −1.046E−17 | 6.087E−20 |
| 4 | 5.637E−14 | −3.994E−17 | 8.168E−21 |
| 5 | −2.840E−14 | −6.400E−17 | 3.179E−20 |
| 6 | — | — | — |

Numerical Example 14

Figure 27:
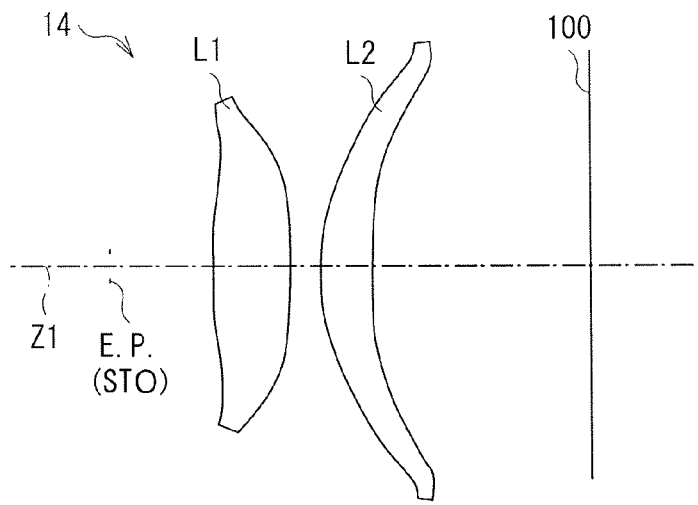
FIG. 27 illustrates a fourteenth configuration example of the eyepiece lens according to the embodiment of the present disclosure, and is a cross-sectional view of a lens corresponding to Numerical example 14.
Figure 28:
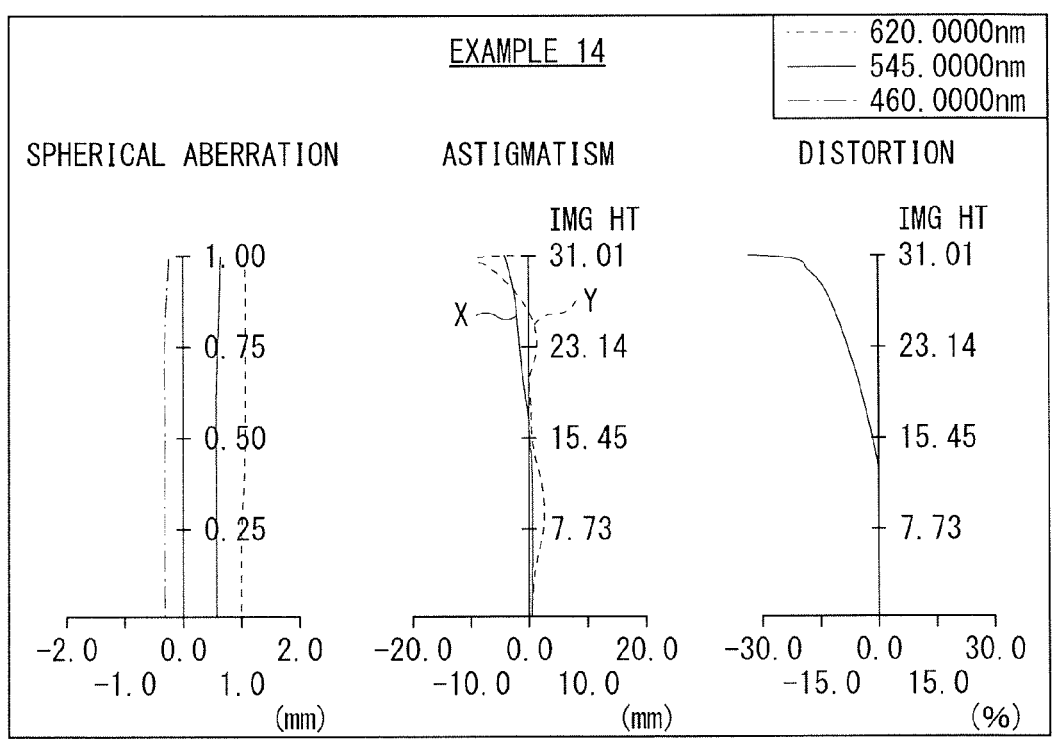
FIG. 28 is an aberration diagram illustrating various aberrations of the eyepiece lens corresponding to Numerical example 14.

Tables 27 and 28 show specific lens data corresponding to an eyepiece lens 14 according to a fourteenth configuration example shown in FIG. 27. In particular, Table 27 shows basic lens data thereof, and Table 28 shows data related to aspherical surfaces. FIG. 28 shows various aberrations of the eyepiece lens 14 according to this Numerical example 14.

TABLE 27

Example 14 Lens data

| Si Surface number | Ri Curvature radius | Di Spacing | Ndi Refractive index | νdi Abbe number |
|---|---|---|---|---|
| 1(STO) | ∞ | 17.000 | — | — |
| 2 | 72.218 | 11.268 | 1.583 | 30.0 |
| 3 | −456.000 | 4.670 | — | — |
| 4 | 38.801 | 7.722 | 1.583 | 30.0 |
| 5 | −432.000 | 32.003 | — | — |
| 6 | ∞ | | | |

TABLE 28

Example 14 Aspherical surface data

| Si Surface number | K Conic constant | 4th order | 6th order | 8th order |
|---|---|---|---|---|
| 1(STO) | — | — | — | — |
| 2 | −1.460E+00 | −9.864E−06 | 1.656E−08 | −1.230E−10 |
| 3 | 0.000E+00 | −1.667E−05 | −8.021E−08 | 3.685E−10 |
| 4 | 0.000E+00 | 1.516E−05 | −5.953E−08 | 5.247E−11 |
| 5 | 0.000E+00 | 4.740E−05 | −1.023E−07 | 1.253E−10 |
| 6 | — | — | — | — |

| Si Surface number | 10th order | 12th order | 14th order |
|---|---|---|---|
| 1(STO) | — | — | — |
| 2 | 2.482E−13 | −1.374E−16 | — |
| 3 | −8.918E−13 | 1.058E−15 | −4.324E−19 |
| 4 | 2.853E−14 | −5.775E−17 | 1.849E−20 |
| 5 | −7.291E−14 | 9.473E−18 | 2.905E−21 |
| 6 | — | — | — |

Numerical Example 15

Figure 29:
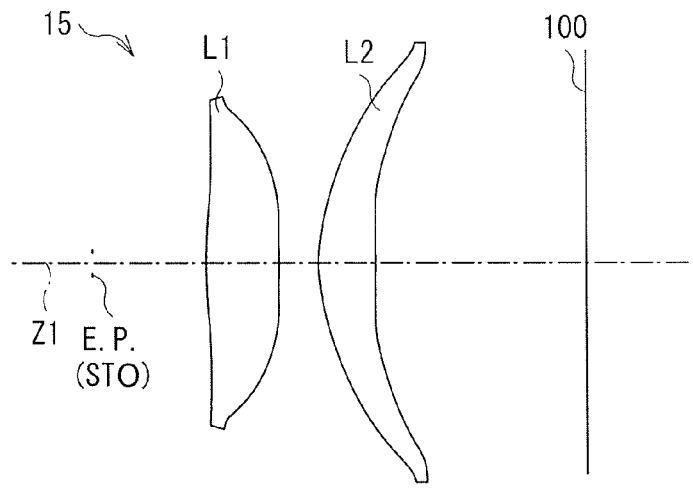
FIG. 29 illustrates a fifteenth configuration example of the eyepiece lens according to the embodiment of the present disclosure, and is a cross-sectional view of a lens corresponding to Numerical example 15.
Figure 30:
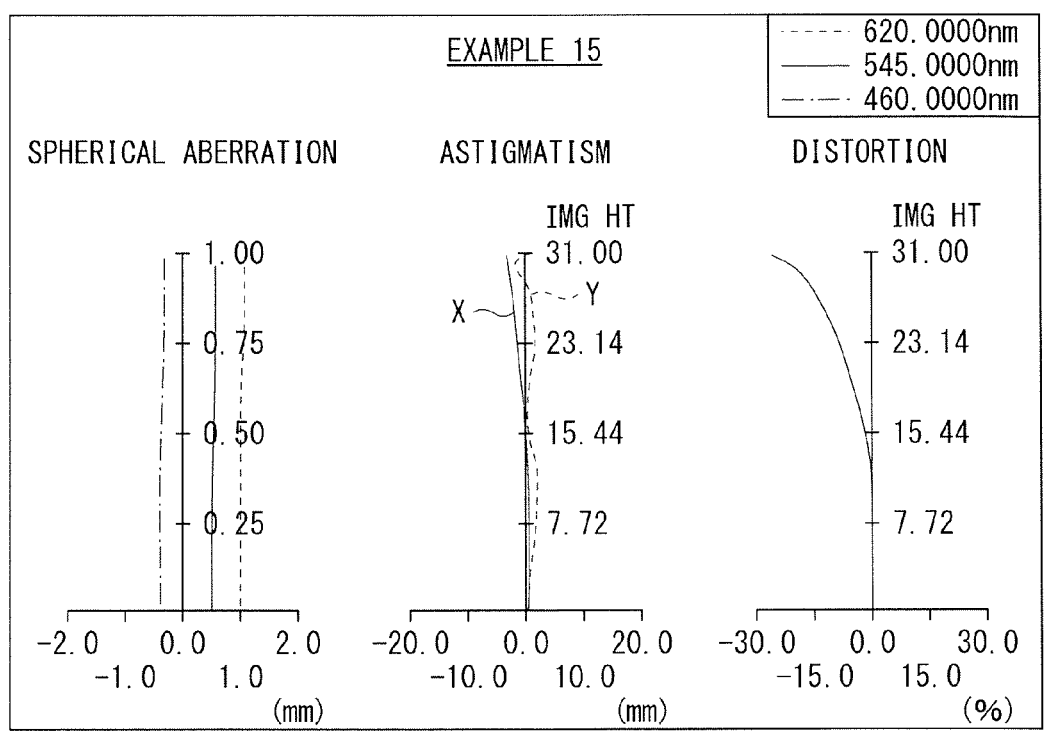
FIG. 30 is an aberration diagram illustrating various aberrations of the eyepiece lens corresponding to Numerical example 15.

Tables 29 and 30 show specific lens data corresponding to an eyepiece lens 15 according to a fifteenth configuration example shown in FIG. 29. In particular, Table 29 shows basic lens data thereof, and Table 30 shows data related to aspherical surfaces. FIG. 30 shows various aberrations of the eyepiece lens 15 according to this Numerical example 15.

TABLE 29

Example 15 Lens data

| Si Surface number | Ri Curvature radius | Di Spacing | Ndi Refractive index | νdi Abbe number |
|---|---|---|---|---|
| 1(STO) | ∞ | 17.000 | — | — |
| 2 | 76.329 | 10.915 | 1.583 | 30.0 |
| 3 | −404.660 | 5.984 | — | — |
| 4 | 38.953 | 8.239 | 1.583 | 30.0 |
| 5 | −366.230 | 31.935 | — | — |
| 6 | ∞ | | | |

TABLE 30

Example 15 Aspherical surface data

| Si Surface number | K Conic constant | 4th order | 6th order | 8th order |
|---|---|---|---|---|
| 1(STO) | — | — | — | — |
| 2 | −1.404E+00 | −2.171E−05 | 7.002E−08 | −2.169E−10 |
| 3 | 0.000E+00 | −3.178E−05 | −1.575E−09 | 2.095E−10 |
| 4 | 0.000E+00 | −1.430E−06 | 2.283E−08 | −1.013E−10 |
| 5 | 0.000E+00 | 2.932E−05 | −6.881E−09 | −1.116E−10 |
| 6 | — | — | — | — |

| Si Surface number | 10th order | 12th order | 14th order |
|---|---|---|---|
| 1(STO) | — | — | — |
| 2 | 3.216E−13 | −1.582E−16 | — |
| 3 | −7.091E−13 | 9.245E−16 | −3.869E−19 |
| 4 | 1.572E−13 | −1.012E−16 | 2.133E−20 |
| 5 | 2.237E−13 | −1.706E−16 | 4.525E−20 |
| 6 | — | — | — |

Numerical Example 16

Figure 31:
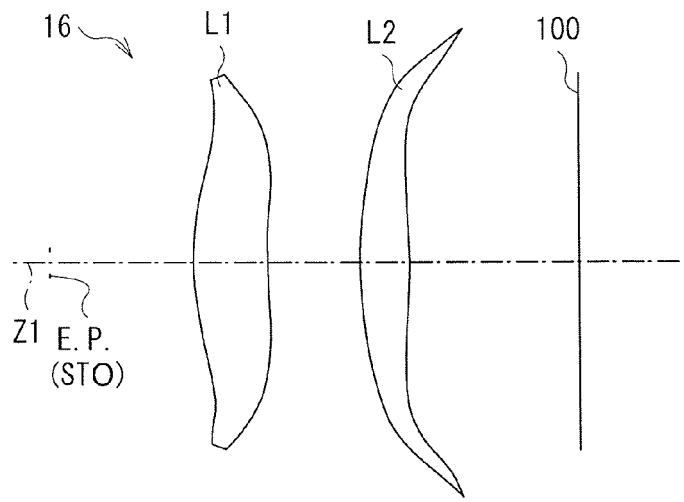
FIG. 31 illustrates a sixteenth configuration example of the eyepiece lens according to the embodiment of the present disclosure, and is a cross-sectional view of a lens corresponding to Numerical example 16.
Figure 32:
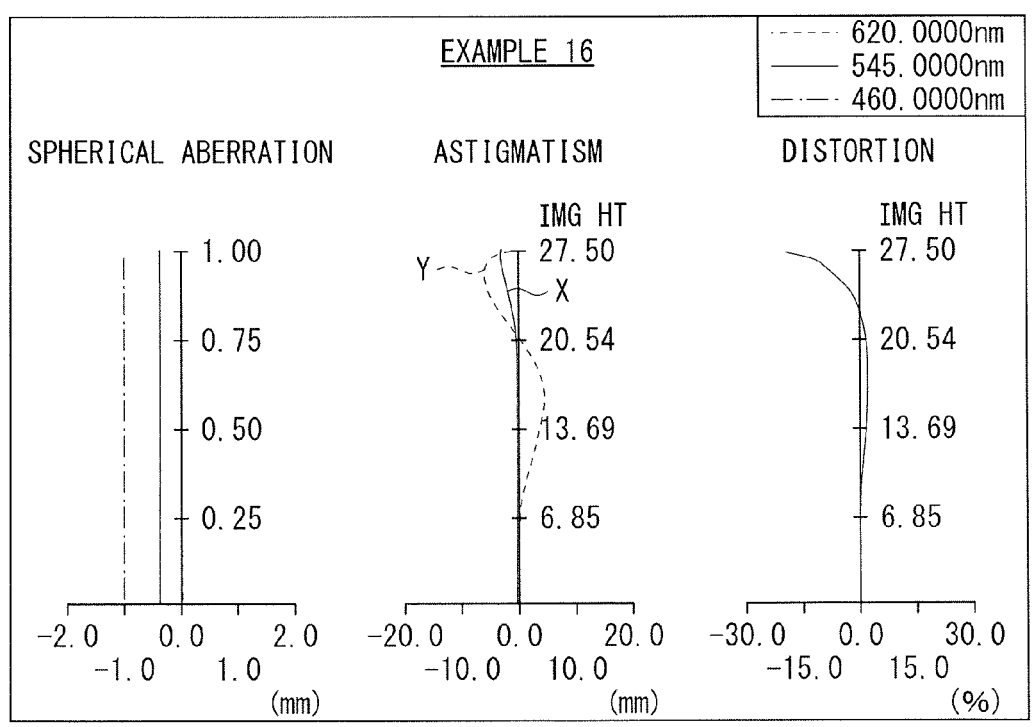
FIG. 32 is an aberration diagram illustrating various aberrations of the eyepiece lens corresponding to Numerical example 16.

Tables 31 and 32 show specific lens data corresponding to an eyepiece lens 16 according to a sixteenth configuration example shown in FIG. 31. In particular, Table 31 shows basic lens data thereof, and Table 32 shows data related to aspherical surfaces. FIG. 32 shows various aberrations of the eyepiece lens 16 according to this Numerical example 16.

TABLE 31

Example 16 Lens data

| Si Surface number | Ri Curvature radius | Di Spacing | Ndi Refractive index | νdi Abbe number |
|---|---|---|---|---|
| 1(STO) | ∞ | 22.000 | — | — |
| 2 | 48.296 | 11.427 | 1.711 | 36.1 |
| 3 | 377.987 | 13.718 | — | — |
| 4 | 76.179 | 7.237 | 1.711 | 36.1 |
| 5 | −88.044 | 25.617 | — | — |
| 6 | ∞ | | | |

TABLE 32

Example 16 Aspherical surface data

| Si Surface number | K Conic constant | 4th order | 6th order | 8th order |
|---|---|---|---|---|
| 1(STO) | — | — | — | — |
| 2 | −1.966E+00 | −1.127E−06 | −1.545E−08 | 1.490E−13 |
| 3 | 0.000E+00 | −3.736E−06 | −3.031E−08 | 3.417E−11 |
| 4 | 0.000E+00 | 5.381E−06 | −3.065E−08 | 5.349E−11 |
| 5 | 0.000E+00 | 1.479E−05 | −1.645E−08 | 3.572E−11 |
| 6 | — | — | — | — |

| Si Surface number | 10th order | 12th order | 14th order |
|---|---|---|---|
| 1(STO) | — | — | — |
| 2 | 9.540E−15 | — | — |
| 3 | −1.534E−14 | — | — |
| 4 | −2.365E−14 | — | — |
| 5 | −2.659E−14 | 4.973E−18 | — |
| 6 | — | — | — |

Numerical Example 17

Figure 33:
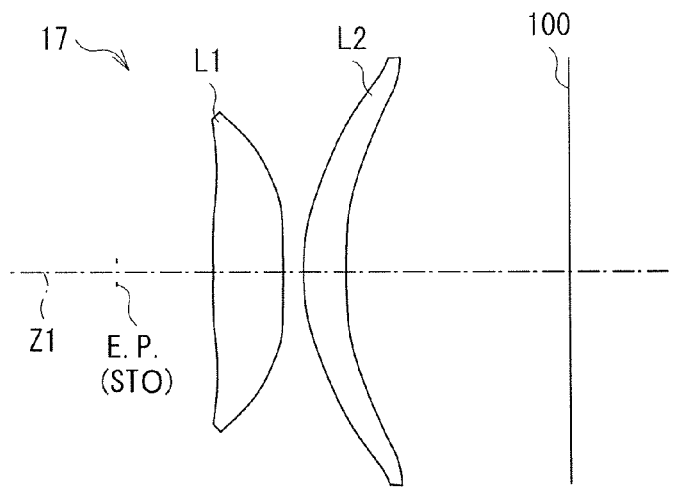
FIG. 33 illustrates a seventeenth configuration example of the eyepiece lens according to the embodiment of the present disclosure, and is a cross-sectional view of a lens corresponding to Numerical example 17.
Figure 34:
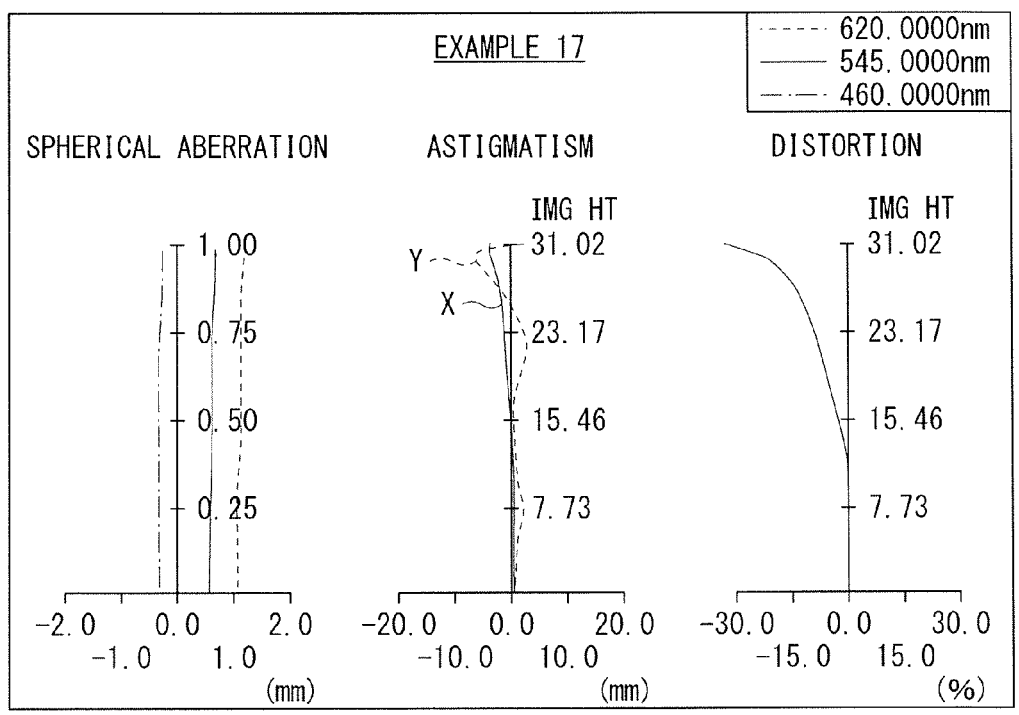
FIG. 34 is an aberration diagram illustrating various aberrations of the eyepiece lens corresponding to Numerical example 17.

Tables 33 and 34 show specific lens data corresponding to an eyepiece lens 17 according to a seventeenth configuration example shown in FIG. 33. In particular, Table 33 shows basic lens data thereof, and Table 34 shows data related to aspherical surfaces. FIG. 34 shows various aberrations of the eyepiece lens 17 according to this Numerical example 17.

TABLE 33

Example 17 Lens data

| Si Surface number | Ri Curvature radius | Di Spacing | Ndi Refractive index | vdi Abbe number |
|---|---|---|---|---|
| 1(STO) | ∞ | 15.000 | — | — |
| 2 | 76.218 | 10.887 | 1.583 | 30.0 |
| 3 | −433.706 | 2.974 | — | — |
| 4 | 39.969 | 6.790 | 1.583 | 30.0 |
| 5 | −378.306 | 33.850 | — | — |
| 6 | ∞ | | | |

TABLE 34

Example 17 Aspherical surface data

| Si Surface number | K Conic constant | 4th order | 6th order | 8th order |
|---|---|---|---|---|
| 1(STO) | — | — | — | — |
| 2 | −1.974E+00 | −2.633E−05 | 8.884E−08 | −2.779E−10 |
| 3 | 0.000E+00 | −3.861E−05 | −3.085E−08 | 3.450E−10 |
| 4 | 0.000E+00 | 3.338E−05 | −1.781E−07 | 3.593E−10 |
| 5 | 0.000E+00 | 7.715E−05 | −2.389E−07 | 3.916E−10 |
| 6 | | | | |

| Si Surface number | 10th order | 12th order | 14th order |
|---|---|---|---|
| 1(STO) | — | — | — |
| 2 | 4.107E−13 | −2.004E−16 | — |
| 3 | −9.256E−13 | 1.102E−15 | −4.478E−19 |
| 4 | −3.529E−13 | 1.690E−16 | −3.318E−20 |
| 5 | −3.449E−13 | 1.511E−16 | −2.661E−20 |
| 6 | — | — | — |

Numerical Example 18

Figure 35:
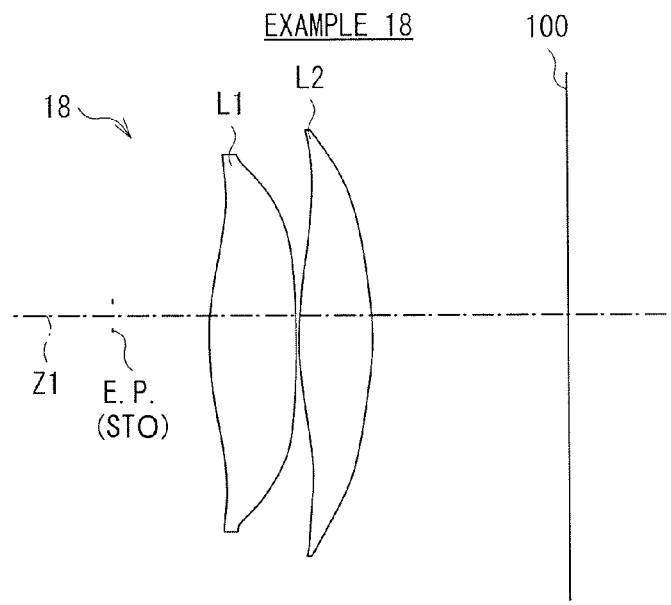
FIG. 35 illustrates an eighteenth configuration example of the eyepiece lens according to the embodiment of the present disclosure, and is a cross-sectional view of a lens corresponding to Numerical example 18.
Figure 36:
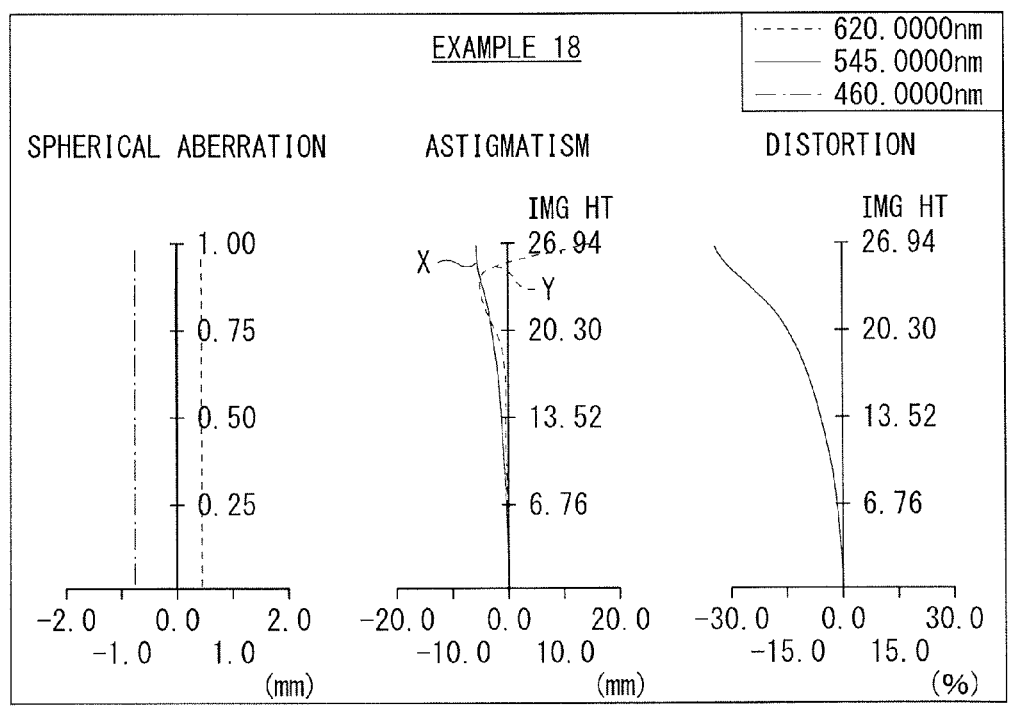
FIG. 36 is an aberration diagram illustrating various aberrations of the eyepiece lens corresponding to Numerical example 18.

Tables 35 and 36 show specific lens data corresponding to an eyepiece lens 18 according to an eighteenth configuration example shown in FIG. 35. In particular, Table 35 shows basic lens data thereof, and Table 36 shows data related to aspherical surfaces. FIG. 36 shows various aberrations of the eyepiece lens 18 according to this Numerical example 18.

TABLE 35

Example 18 Lens data

| Si Surface number | Ri Curvature radius | Di Spacing | Ndi Refractive index | vdi Abbe number |
|---|---|---|---|---|
| 1(STO) | ∞ | 20.000 | — | — |
| 2 | 49.223 | 13.200 | 1..525 | 56.6 |
| 3 | 404.171 | 1.000 | — | — |
| 4 | 78.839 | 10.984 | 1.635 | 23.8 |
| 5 | −56.255 | 30.280 | — | — |
| 6 | ∞ | | | |

TABLE 36

Example 18 Aspherical surface data

| Si Surface number | K Conic constant | 4th order | 6th order | 8th order |
|---|---|---|---|---|
| 1(STO) | — | — | — | — |
| 2 | −2.178E+00 | −1.400E−05 | 4.442E−08 | −1.085E−10 |
| 3 | 0.000E+00 | −2.138E−05 | 2.574E−08 | −1.053E−10 |
| 4 | 0.000E+00 | 1.527E−06 | −2.473E−08 | 1.590E−11 |
| 5 | 0.000E+00 | 1.381E−05 | −6.737E−09 | −5.957E−11 |
| 6 | | | | |

| Si Surface number | 10th order | 12th order | 14th order |
|---|---|---|---|
| 1(STO) | — | — | — |
| 2 | 1.051E−13 | −3.399E−17 | — |
| 3 | 2.461E−13 | −2.572E−16 | 9.810E−20 |
| 4 | 1.898E−14 | −2.177E−17 | 4.673E−21 |
| 5 | 1.093E−13 | −7.400E−17 | 1.819E−20 |
| 6 | — | — | — |

Numerical Example 19

Figure 37:
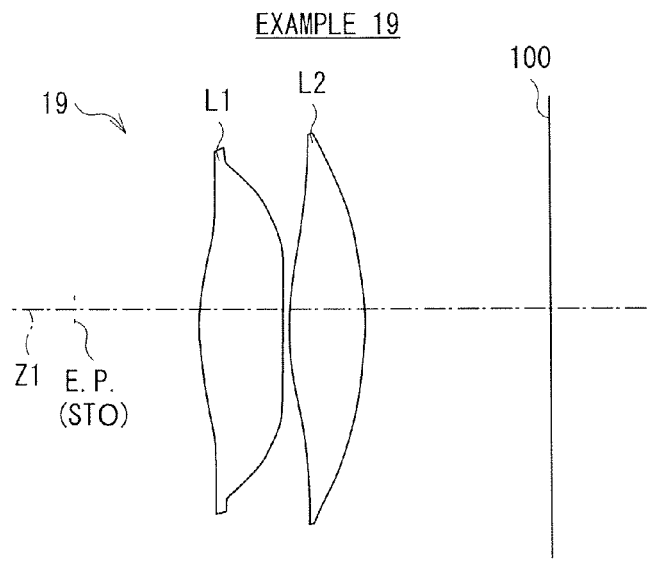
FIG. 37 illustrates a nineteenth configuration example of the eyepiece lens according to the embodiment of the present disclosure, and is a cross-sectional view of a lens corresponding to Numerical example 19.
Figure 38:
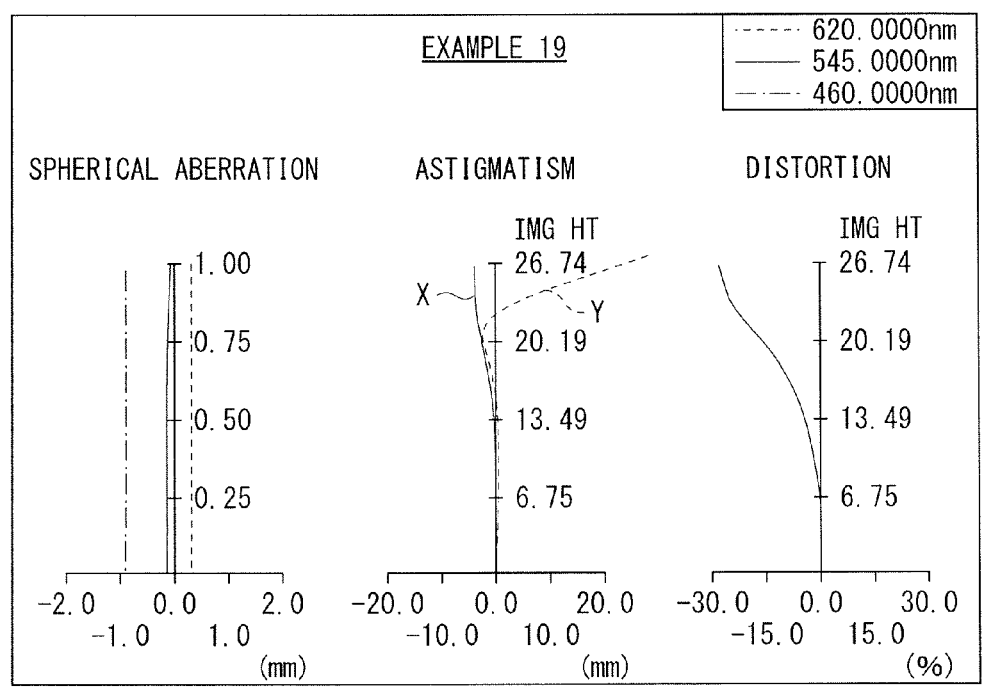
FIG. 38 is an aberration diagram illustrating various aberrations of the eyepiece lens corresponding to Numerical example 19.

Tables 37 and 38 show specific lens data corresponding to an eyepiece lens 19 according to a nineteenth configuration example shown in FIG. 37. In particular, Table 37 shows basic lens data thereof, and Table 38 shows data related to aspherical surfaces. FIG. 38 shows various aberrations of the eyepiece lens 19 according to this Numerical example 19.

TABLE 37

Example 19 Lens data

| Si Surface number | Ri Curvature radius | Di Spacing | Ndi Refractive index | vdi Abbe number |
|---|---|---|---|---|
| 1(STO) | ∞ | 20.000 | — | — |
| 2 | 53.216 | 13.200 | 1.583 | 30.0 |
| 3 | 289.524 | 1.029 | — | — |
| 4 | 63.749 | 12.000 | 1.583 | 30.0 |
| 5 | −52.239 | 29.200 | — | — |
| 6 | ∞ | | | |

TABLE 38

Example 19 Aspherical surface data

| Si Surface number | K Conic constant | 4th order | 6th order | 8th order |
|---|---|---|---|---|
| 1(STO) | — | — | — | — |
| 2 | −1.347E+00 | −1.231E−05 | 2.919E−08 | −6.706E−11 |
| 3 | 0.000E+00 | −1.543E−05 | −9.511E−09 | 1.169E−11 |
| 4 | 0.000E+00 | 1.191E−06 | −2.448E−08 | 1.582E−11 |
| 5 | 0.000E+00 | 1.551E−05 | −6.385E−09 | −5.937E−11 |
| 6 | — | — | — | — |

| Si Surface number | 10th order | 12th order | 14th order |
|---|---|---|---|
| 1(STO) | — | — | — |
| 2 | 6.197E−14 | −1.858E−17 | — |
| 3 | 3.727E−14 | −7.348E−17 | 3.649E−20 |
| 4 | 1.877E−14 | −2.151E−17 | 5.015E−21 |
| 5 | 1.096E−13 | −7.396E−17 | 1.791E−20 |
| 6 | — | — | — |

Numerical Example 20

Figure 39:
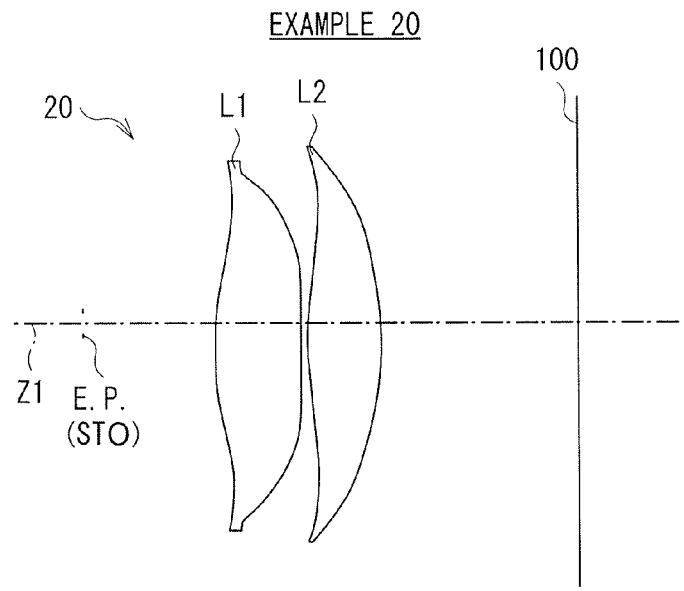
FIG. 39 illustrates a twentieth configuration example of the eyepiece lens according to the embodiment of the present disclosure, and is a cross-sectional view of a lens corresponding to Numerical example 20.
Figure 40:
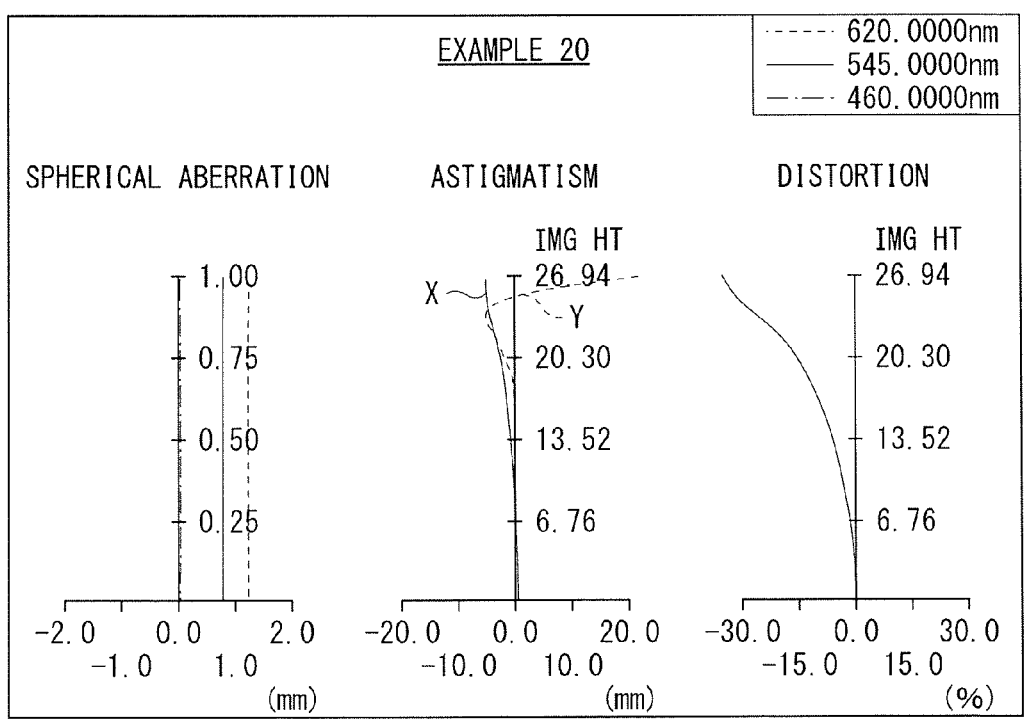
FIG. 40 is an aberration diagram illustrating various aberrations of the eyepiece lens corresponding to Numerical example 20.

Tables 39 and 40 show specific lens data corresponding to an eyepiece lens 20 according to a twentieth configuration example shown in FIG. 39. In particular, Table 39 shows basic lens data thereof, and Table 40 shows data related to aspherical surfaces. FIG. 40 shows various aberrations of the eyepiece lens 20 according to this Numerical example 20.

TABLE 39

Example 20 Lens data

| Si Surface number | Ri Curvature radius | Di Spacing | Ndi Refractive index | vdi Abbe number |
|---|---|---|---|---|
| 1(STO) | ∞ | 20.000 | — | — |
| 2 | 48.852 | 13.200 | 1.525 | 56.6 |
| 3 | 408.968 | 1.000 | — | — |
| 4 | 88.416 | 10.987 | 1.635 | 23.8 |
| 5 | −52.000 | 29.606 | — | — |
| 6 | ∞ | | | |

TABLE 40

Example 20 Aspherical surface data

| Si Surface number | K Conic constant | 4th order | 6th order | 8th order |
|---|---|---|---|---|
| 1(STO) | — | — | — | — |
| 2 | −2.178E+00 | −1.544E−05 | 5.438E−08 | −1.347E−10 |

TABLE 40-continued

Example 20 Aspherical surface data

| | | | | |
|---|---|---|---|---|
| 3 | 0.000E+00 | −2.294E−05 | 3.503E−08 | −1.226E−10 |
| 4 | 0.000E+00 | 1.551E−06 | −2.481E−08 | 1.584E−11 |
| 5 | 0.000E+00 | 1.362E−05 | −6.753E−09 | −5.956E−11 |
| 6 | — | — | — | — |

| Si Surface number | 10th order | 12th order | 14th order |
|---|---|---|---|
| 1(STO) | — | — | — |
| 2 | 1.345E−13 | −4.588E−17 | — |
| 3 | 2.630E−13 | −2.677E−16 | 1.013E−19 |
| 4 | 1.895E−14 | −2.181E−17 | 4.669E−21 |
| 5 | 1.093E−13 | −7.396E−17 | 1.823E−20 |
| 6 | — | — | — |

Other Numerical Data of Respective Examples

Table 41 summarizes values related to the above-described respective conditional expressions for the respective numerical examples. Tables 42 and 43 each summarize values of parameters used in the above-described respective conditional expressions for the respective numerical examples. As can be seen from Table 41, each of the values in the respective numerical examples falls within a range of the related numerical values in each conditional expression.

TABLE 41

| Conditional expression | Example 1 | Example 2 | Example 3 | Example 4 | Example 5 |
|---|---|---|---|---|---|
| (1) $3.0 > (h \times \omega)^{1/2}/E > 1.2$ | 2.371 | 2.371 | 2.371 | 1.775 | 2.119 |
| (2) $2.3 > (L - E)/h > 1.5$ | 1.982 | 1.982 | 1.982 | 1.817 | 1.799 |
| (3) $3.7 > (f1 \ast f2)^{1/2}/f > 1.4$ | 2.564 | 2.061 | 2.701 | 2.192 | 2.473 |
| (4) $40 > |(R3 + R5)/(R3 - R5)|$ | 0.014 | 0.312 | 0.040 | 1.024 | 1.327 |
| (5) $1.9 > R4/f2 > 0.4$ | 0.965 | 0.922 | 0.981 | 0.751 | 0.797 |
| (6) $1.0 > R2/f1 > 0.1$ | 0.199 | 0.427 | 0.187 | 0.644 | 0.767 |
| (7) $1.2 > (D2 + D4)/(D3 + D5) > 0.2$ | 0.845 | 0.897 | 0.890 | 0.469 | 0.641 |

| | Example 6 | Example 7 | Example 8 | Example 9 | Example 10 |
|---|---|---|---|---|---|
| (1) $3.0 > (h \times \omega)^{1/2}/E > 1.2$ | 2.181 | 2.041 | 2.371 | 2.477 | 2.503 |
| (2) $2.3 > (L - E)/h > 1.5$ | 1.737 | 1.883 | 1.976 | 1.826 | 1.856 |
| (3) $3.7 > (f1 \ast f2)^{1/2}/f > 1.4$ | 2.515 | 2.720 | 2.488 | 2.024 | 1.972 |
| (4) $40 > |(R3 + R5)/(R3 - R5)|$ | 1.165 | 1.056 | 1.035 | 1.155 | 2.897 |
| (5) $1.9 > R4/f2 > 0.4$ | 0.813 | 0.833 | 0.927 | 0.793 | 0.732 |
| (6) $1.0 > R2/f1 > 0.1$ | 0.724 | 0.563 | 0.549 | 0.665 | 0.743 |
| (7) $1.2 > (D2 + D4)/(D3 + D5) > 0.2$ | 0.642 | 0.705 | 0.945 | 0.530 | 0.551 |

| | Example 11 | Example 12 | Example 13 | Example 14 | Example 15 |
|---|---|---|---|---|---|
| (1) $3.0 > (h \times \omega)^{1/2}/E > 1.2$ | 2.069 | 2.371 | 2.010 | 2.486 | 2.169 |
| (2) $2.3 > (L - E)/h > 1.5$ | 1.902 | 1.982 | 1.912 | 1.801 | 1.847 |
| (3) $3.7 > (f1 \ast f2)^{1/2}/f > 1.4$ | 3.085 | 3.085 | 3.345 | 1.940 | 1.940 |
| (4) $40 > |(R3 + R5)/(R3 - R5)|$ | 1.072 | 0.215 | 1.012 | 37.000 | 20.060 |
| (5) $1.9 > R4/f2 > 0.4$ | 0.884 | 0.943 | 0.862 | 0.638 | 0.646 |
| (6) $1.0 > R2/f1 > 0.1$ | 0.637 | 0.186 | 0.598 | 0.676 | 0.694 |
| (7) $1.2 > (D2 + D4)/(D3 + D5) > 0.2$ | 0.667 | 0.899 | 0.677 | 0.518 | 0.505 |

| | Example 16 | Example 17 | Example 18 | Example 19 | Example 20 |
|---|---|---|---|---|---|
| (1) $3.0 > (h \times \omega)^{1/2}/E > 1.2$ | 1.508 | 2.517 | 1.778 | 1.778 | 1.778 |
| (2) $2.3 > (L - E)/h > 1.5$ | 2.109 | 1.758 | 1.836 | 1.840 | 1.811 |
| (3) $3.7 > (f1 \ast f2)^{1/2}/f > 1.4$ | 1.669 | 1.975 | 1.920 | 1.940 | 1.913 |
| (4) $40 > |(R3 + R5)/(R3 - R5)|$ | 0.622 | 14.657 | 0.756 | 0.694 | 0.774 |
| (5) $1.9 > R4/f2 > 0.4$ | 1.310 | 0.647 | 1.490 | 1.257 | 1.677 |
| (6) $1.0 > R2/f1 > 0.1$ | 0.634 | 0.687 | 0.469 | 0.490 | 0.471 |
| (7) $1.2 > (D2 + D4)/(D3 + D5) > 0.2$ | 0.474 | 0.480 | 0.773 | 0.834 | 0.790 |

TABLE 42

| Parameter | Example 1 | Example 2 | Example 3 | Example 4 | Example 5 |
|---|---|---|---|---|---|
| h | 27.50 | 27.50 | 27.50 | 30.00 | 30.00 |
| ω | 46.00 | 46.00 | 46.00 | 42.00 | 48.50 |
| L | 69.50 | 69.50 | 69.50 | 74.50 | 71.98 |
| E | 15.00 | 15.00 | 15.00 | 20.00 | 18.00 |
| f | 36.72 | 36.24 | 36.60 | 42.06 | 39.07 |
| f1 | 235.32 | 130.94 | 260.78 | 156.42 | 200.16 |
| f2 | 37.67 | 42.58 | 37.48 | 54.31 | 46.63 |
| R2 | 46.91 | 55.85 | 48.81 | 100.81 | 153.56 |
| R3 | 60.82 | 150.50 | 64.62 | −18926.62 | −2111.00 |
| R4 | 36.37 | 39.26 | 36.78 | 40.79 | 37.16 |
| R5 | −62.53 | −78.97 | −59.70 | −226.71 | −296.46 |
| D2 | 12.80 | 14.00 | 12.80 | 12.29 | 11.63 |
| D3 | 3.60 | 4.30 | 2.71 | 0.80 | 0.95 |
| D4 | 12.17 | 12.00 | 12.86 | 5.10 | 9.45 |
| D5 | 25.93 | 24.70 | 26.13 | 36.31 | 31.95 |

| | Example 6 | Example 7 | Example 8 | Example 9 | Example 10 |
|---|---|---|---|---|---|
| h | 30.00 | 30.00 | 27.50 | 30.00 | 30.00 |
| ω | 48.00 | 45.00 | 46.00 | 46.00 | 47.00 |
| L | 69.50 | 74.50 | 69.33 | 69.78 | 70.68 |
| E | 17.40 | 18.00 | 15.00 | 15.00 | 15.00 |
| f | 39.21 | 39.66 | 37.46 | 38.65 | 39.24 |
| f1 | 212.12 | 259.78 | 201.16 | 121.69 | 112.94 |
| f2 | 45.83 | 44.82 | 43.16 | 50.31 | 53.02 |
| R2 | 153.58 | 146.34 | 110.37 | 80.89 | 83.94 |
| R3 | −2111.00 | −2111.00 | −2688.94 | −2111.00 | −505.00 |
| R4 | 37.24 | 37.33 | 40.03 | 39.91 | 38.80 |
| R5 | −160.98 | −57.21 | −46.00 | −152.10 | −245.81 |
| D2 | 10.07 | 11.08 | 11.40 | 9.17 | 9.23 |
| D3 | 3.06 | 0.95 | 0.50 | 6.96 | 7.60 |
| D4 | 11.70 | 12.28 | 15.00 | 9.81 | 10.55 |
| D5 | 30.87 | 32.19 | 27.43 | 28.83 | 28.30 |

TABLE 43

| Parameter | Example 11 | Example 12 | Example 13 | Example 14 | Example 15 |
|---|---|---|---|---|---|
| h | 27.50 | 127.50 | 27.50 | 30.90 | 30.90 |
| ω | 45.00 | 46.00 | 45.00 | 45.00 | 44.00 |
| L | 69.32 | 69.50 | 70.08 | 70.66 | 74.07 |
| E | 17.00 | 15.00 | 17.50 | 15.00 | 17.00 |
| f | 37.26 | 37.26 | 37.63 | 41.55 | 41.98 |
| f1 | 322.04 | 322.04 | 388.79 | 106.76 | 110.03 |
| f2 | 41.02 | 41.02 | 40.75 | 60.86 | 60.27 |
| R2 | 205.24 | 59.88 | 232.35 | 72.22 | 76.33 |
| R3 | −2433.92 | 92.47 | −14888.00 | −456.00 | −404.66 |
| R4 | 36.28 | 38.70 | 35.15 | 38.80 | 38.95 |
| R5 | −84.27 | −59.78 | −88.82 | −432.00 | −366.23 |
| D2 | 10.14 | 12.80 | 10.01 | 11.27 | 10.91 |
| D3 | 0.50 | 1.40 | 0.30 | 4.67 | 5.98 |
| D4 | 10.79 | 13.00 | 11.24 | 7.72 | 8.24 |
| D5 | 30.88 | 27.30 | 31.08 | 32.00 | 31.93 |

| | Example 16 | Example 17 | Example 18 | Example 19 | Example 20 |
|---|---|---|---|---|---|
| h | 27.50 | 31.00 | 27.50 | 27.50 | 27.50 |
| ω | 40.00 | 46.00 | 46.00 | 46.00 | 46.00 |
| L | 80.00 | 69.50 | 70.50 | 70.60 | 69.80 |
| E | 22.00 | 15.00 | 20.00 | 20.00 | 20.00 |
| f | 39.86 | 41.94 | 38.80 | 38.25 | 38.68 |
| f1 | 76.15 | 111.01 | 104.85 | 108.53 | 103.80 |
| f2 | 58.13 | 61.79 | 52.93 | 50.72 | 52.72 |
| R2 | 48.30 | 76.22 | 49.22 | 53.22 | 48.85 |
| R3 | 377.99 | −433.71 | 404.17 | 289.52 | 408.97 |
| R4 | 76.18 | 39.97 | 78.84 | 63.75 | 88.42 |
| R5 | −88.04 | −378.31 | −56.26 | −52.24 | −52.00 |
| D2 | 11.43 | 10.89 | 13.20 | 13.20 | 13.20 |
| D3 | 13.72 | 2.97 | 1.00 | 1.03 | 1.00 |
| D4 | 7.24 | 6.79 | 10.98 | 12.00 | 10.99 |
| D5 | 25.62 | 33.85 | 30.28 | 29.20 | 29.61 |

5. Other Embodiments

The technology of the present disclosure is not limited to the above description of the embodiment and Examples, and various modifications may be made.

For example, the shapes and the numerical values shown in the above-described respective numerical examples are mere examples for embodying the present technology, and should not be used to limitedly understand the technical range of the present technology.

In the above-described embodiment and Examples, the configuration substantially configured of two lenses has been described. However, a lens substantially having no refractive power may be further included.

It is possible to achieve at least the following configurations from the above-described example embodiments and the modifications of the disclosure.

[1] An eyepiece lens including:
a first lens having positive refractive power, the first lens having a convex surface that faces toward an eye point side; and
a second lens having positive refractive power, the second lens having a convex surface that faces toward the eye point side,
the first and second lenses being arranged in order from the eye point side, wherein
following conditional expressions are satisfied, $$3.0 > (h \times \omega)^{1/2}/E > 1.2 \quad (1)$$

$$2.3 > (L-E)/h > 1.5 \quad (2)$$

where h is a height of the image at a horizontal end,
ω is a half angle of view in a horizontal direction,
E is a distance from an eye point to the first lens, the distance being an eye relief, and
L is a distance from the eye point to the image.

[2] The eyepiece lens according to [1], wherein a following conditional expression is satisfied, $$3.7 > (f1 \times f2)^{1/2}/f > 1.4 \quad (3)$$

where f is a total focal length,
f1 is a focal length of the first lens, and
f2 is a focal length of the second lens.

[3] The eyepiece lens according to [1] or [2], wherein a following conditional expression is satisfied, $$40 > |(R3+R5)/(R3-R5)| \quad (4)$$

where R3 is a paraxial curvature radius of an image-sided surface of the first lens, and
R5 is a paraxial curvature radius of an image-sided surface of the second lens.

[4] The eyepiece lens according to any one of [1] to [3], wherein a following conditional expression is satisfied, $$1.9 > R4/f2 > 0.4 \quad (5)$$

where R4 is a paraxial curvature radius of the eye-point-sided surface of the second lens.

[5] The eyepiece lens according to any one of [1] to [4], wherein a following conditional expression is satisfied, $$1.0 > R2/f1 > 0.1 \quad (6)$$

where R2 is a paraxial curvature radius of the eye-point-sided surface of the first lens.

[6] The eyepiece lens according to any one of [1] to [5], wherein a following conditional expression is satisfied, wherein $$1.2 > (D2+D4)/(D3+D5) > 0.2 \quad (7)$$

wherein D2 is a central thickness of the first lens,
D3 is a spacing between the first lens and the second lens,
D4 is a central thickness of the second lens, and
D5 is a spacing between the second lens and the image.

[7] The eyepiece lens according to any one of [1] to [6], wherein an image-sided surface of the first lens and an image-sided surface of the second lens each have an aspherical shape.

[8] The eyepiece lens according to any one of [1] to [7], wherein the eye-point-sided surface of the first lens has an aspherical shape that has an inflection point.

[9] The eyepiece lens according to any one of [1] to [8], wherein the first and second lenses are each configured of a material having a linear expansion coefficient of $20 \times 10^{-6}/°$ C. or larger.

[10] The eyepiece lens according to any one of [1] to [9], further including a lens substantially having no refractive power.

[11] A display unit including:
an image display device; and
an eyepiece lens configured to allow an image displayed on the image display device to be magnified,
the eyepiece lens including
a first lens having positive refractive power, the first lens having a convex surface that faces toward an eye point side, and
a second lens having positive refractive power, the second lens having a convex surface that faces toward the eye point side,
the first and second lenses being arranged in order from the eye point side, wherein
following conditional expressions are satisfied, $$3.0 > (h \times \omega)^{1/2}/E > 1.2 \quad (1)$$

$$2.3 > (L-E)/h > 1.5 \quad (2)$$

where h is a height of the image at a horizontal end,
$\omega$ is a half angle of view in a horizontal direction,
E is a distance from an eye point to the first lens, the distance being an eye relief, and
L is a distance from the eye point to the image.

[12] The display unit according to [11], wherein the eyepiece lens further includes a lens substantially having no refractive power.

It should be understood by those skilled in the art that various modifications, combinations, sub-combinations, and alterations may occur depending on design requirements and other factors insofar as they are within the scope of the appended claims or the equivalents thereof.

What is claimed is:

1. An eyepiece lens comprising:
a first lens having positive refractive power, the first lens having a convex surface that faces toward an eye point side; and
a second lens having positive refractive power, the second lens having a convex surface that faces toward the eye point side,
the first and second lenses being arranged in order from the eye point side, wherein
following conditional expressions are satisfied, $$3.0 > (h \times \omega)^{1/2}/E > 1.2 \quad (1)$$

$$2.3 > (L-E)/h > 1.5 \quad (2)$$

where h is a height of an image at a horizontal end,
$\omega$ is a half angle of view in a horizontal direction,
E is a distance from an eye point to the first lens, the distance being an eye relief, and
L is a distance from the eye point to the image.

2. The eyepiece lens according to claim 1, wherein a following conditional expression is satisfied, $$3.7 > (f1 \times f2)^{1/2}/f > 1.4 \quad (3)$$

where f is a total focal length,
f1 is a focal length of the first lens, and
f2 is a focal length of the second lens.

3. The eyepiece lens according to claim 1, wherein a following conditional expression is satisfied, $$40 > |(R3+R5)/(R3-R5)| \quad (4)$$

where R3 is a paraxial curvature radius of an image-sided surface of the first lens, and
R5 is a paraxial curvature radius of an image-sided surface of the second lens.

4. The eyepiece lens according to claim 1, wherein a following conditional expression is satisfied, $$1.9 > R4/f2 > 0.4 \quad (5)$$

where R4 is a paraxial curvature radius of the eye-point-sided surface of the second lens.

5. The eyepiece lens according to claim 1, wherein a following conditional expression is satisfied, $$1.0 > R2/f1 > 0.1 \quad (6)$$

where R2 is a paraxial curvature radius of the eye-point-sided surface of the first lens.

6. The eyepiece lens according to claim 1, wherein a following conditional expression is satisfied, wherein $$1.2 > (D2+D4)/(D3+D5) > 0.2 \quad (7)$$

wherein D2 is a central thickness of the first lens,
D3 is a spacing between the first lens and the second lens,
D4 is a central thickness of the second lens, and
D5 is a spacing between the second lens and the image.

7. The eyepiece lens according to claim 1, wherein an image-sided surface of the first lens and an image-sided surface of the second lens each have an aspherical shape.

8. The eyepiece lens according to claim 1, wherein the eye-point-sided surface of the first lens has an aspherical shape that has an inflection point.

9. The eyepiece lens according to claim 1, wherein the first and second lenses are each configured of a material having a linear expansion coefficient of $20 \times 10^{-6}/°$ C. or larger.

10. A display unit comprising:
an image display device; and
an eyepiece lens configured to allow an image displayed on the image display device to be magnified,
the eyepiece lens including
a first lens having positive refractive power, the first lens having a convex surface that faces toward an eye point side, and
a second lens having positive refractive power, the second lens having a convex surface that faces toward the eye point side,
the first and second lenses being arranged in order from the eye point side, wherein
following conditional expressions are satisfied, $$3.0 > (h \times \omega)^{1/2}/E > 1.2 \quad (1)$$

$$2.3 > (L-E)/h > 1.5 \quad (2)$$

where h is a height of the image at a horizontal end,
$\omega$ is a half angle of view in a horizontal direction, E is a distance from an eye point to the first lens, the distance being an eye relief, and L is a distance from the eye point to the image.

* * * * *